United States Patent [19]
Rich

[11] Patent Number: 5,796,396
[45] Date of Patent: Aug. 18, 1998

[54] MULTIPLE USER/AGENT WINDOW CONTROL

[75] Inventor: Charles Rich, Newton, Mass.

[73] Assignee: Mitsubishi Electric Information Technology Center America, Inc., Cambridge, Mass.

[21] Appl. No.: 869,468

[22] Filed: Jun. 5, 1997

Related U.S. Application Data

[63] Continuation of Ser. No. 414,282, Mar. 31, 1995, abandoned.

[51] Int. Cl.$^6$ .................................................. G06F 9/22
[52] U.S. Cl. .................................. 345/332; 345/331
[58] Field of Search .............................. 395/390, 334, 395/326, 329, 330, 331, 333; 345/340, 339, 320, 341, 330, 331, 332, 333, 346

[56] References Cited

U.S. PATENT DOCUMENTS

| | | | |
|---|---|---|---|
| 4,815,032 | 3/1989 | Fujii | 235/380 |
| 4,975,896 | 12/1990 | D'Agosto, III et al. | 369/29 |
| 5,008,853 | 4/1991 | Bly et al. | 345/331 |
| 5,150,466 | 9/1992 | Barlow et al. | 362/337 |
| 5,220,657 | 6/1993 | Bly et al. | 711/152 |
| 5,287,519 | 2/1994 | Dayan et al. | 395/188.01 |

Primary Examiner—Matthew M. Kim
Assistant Examiner—Steven P. Sax
Attorney, Agent, or Firm—Robert K. Tendler

[57] ABSTRACT

A system is provided to automatically control input permission when multiple users and/or software agents interact with a single, shared application in a window-based computing environment, and to indicate to all users which user or software agent currently is providing input or seeking input permission. The system operates by providing each user and agent with a specialized cursor icon that is used for displaying input-permission status and for requesting and relinquishing input-permission. Cursors have three modes with distinct appearances indicating whether the corresponding user or agent has, does not have, or desires input permission. Cursors are replicated on all displays, so that all users can at all times easily see who has or desires input permission. Users interact with the input-permission system by moving and clicking their mouse. Software agents achieve the same effects by sending control requests directly to a software interface provided as part of the invention. In one embodiment, each user and agent also has an assigned Home Window, which is used for identification and to compose and display text messages.

12 Claims, 17 Drawing Sheets

MULTIPLE USER/AGENT WINDOW CONTROL

This is a continuation of application Ser. No. 08/414,282 filed on Mar. 31, 1995 now abandoned.

FIELD OF THE INVENTION

This invention relates to the graphical user interface in window-based computing environments and more particularly to controlling input to a window that is being shared between two or more remote users or programs.

BACKGROUND OF THE INVENTION

It is often convenient for computer users at different locations to be able to view and interact simultaneously with a single window-based application program. For example, when a user calls a software help line, rather than just describing the problem in words, the user can actually demonstrate the problem to a remote helper using a shared window. During the process, the remote helper can also provide input to the same window to help in the diagnosis.

The current state of the art in this kind of remote window sharing is typified by Hewlett packard's SharedX, Hp product Number B2305 L, or the Xy system described in "Xmc and Xy—Scalable Window Sharing and Mobility," C. Bormann, and G. Hoffman, 8th Annual X Technical Conference, Boston, Mass., January, 1994.

These systems are extensions to the X Window System that allow real-time sharing of X-protocol based applications between two or more remote users or displays. In such systems, the shared application window is automatically replicated on all users' displays, so that all users can simultaneously see changes in the state of the application. However, only users who have input permission are allowed to provide input to the application, e.g., by clicking with a mouse or using a keyboard. Any number of users can have input permission at the same time, with input permissions displayed and changed via toggle buttons next to users' names on a separate control window.

Two major areas of deficiency in SharedX and similar systems are described below. First, the graphical user interface in current window sharing systems is confusing and awkward. The main problem, acknowledged in Chapter 4 of the SharedX 2.0 User's Guide, is that when sharing a window with several remote users who have input permission, it is confusing to tell who is inputting at any given time.

For example, suppose three users are sharing the same application window, such as a spreadsheet or drawing program. If two of the users both have input permission and one of them pushes a button on the shared window, the third user will see the button move, but will not be able to tell from his display who pressed it. Furthermore, if two users with input permission both start pressing buttons at the same time, they are likely to interfere with each other's work.

One solution to this problem would be to only let one user have input permission at a time. However, that is not the way that current systems are usually used, because changing input permissions requires going to a separate control window, which is inconvenient and interrupts the flow of the collaboration between users.

Moreover, when two people are viewing a display in the traditional way, i.e., standing or sitting side by side, they often point to items on the display with their fingers, or use the mouse to point out items. Unfortunately, window sharing systems like SharedX do not replicate mouse pointers on all users' displays. Instead SharedX provides separate telepointer icons which users have to explicitly click and drag around, which is much more awkward than just pointing with the mouse.

The second major area of deficiency of current window sharing systems is that, because they were only designed for sharing between human users, they do not provide a well-defined software interface to allow software agents to play the role of remote users. For the present purposes, a software agent is any program that interacts both with human users and some shared application program. In the future, software help lines, for example, may provide an intelligent software agent instead of a human helper to assist users with simple problems.

SUMMARY OF INVENTION

The solution to the problems with the prior art described above is, first, to provide a software interface whereby software agents can participate in window sharing on the same basis as human users, second, to provide an automatic input-permission system that allows at most one user or software agent to have input permission at a time, and third, to provide clear indication on all displays of who is currently providing input.

The automatic input-permission system allows at most one user or software agent to have input permission at a time, but makes it easy for users and agents to obtain and relinquish input permission without interrupting the flow of collaboration. This is achieved by providing each user or software agent with a single cursor icon on the shared window that is used for pointing, for inputting, for displaying input-permission status, and for requesting and relinquishing inputpermission. Each cursor is replicated on all displays.

In order to distinguish identity, each cursor has a different basic appearance, such as a different color or shape. For example, in one embodiment of the invention, each cursor is in a different color pointing hand icon.

In order to support software agents as well as human users, in one embodiment the automatic input-permission system is divided into two modules: a controller and a translator. The controller is a program that receives control requests, e.g., requests to grant or relinquish input permission, from other programs. Software agents send control requests directly to the controller's software interface. The job of the translator component is to translate a user's cursor actions into control requests according to the rules described below.

In one embodiment, the automatic input-permission system operates as follows. Each cursor has three modes, also distinguished by appearance. When a cursor is in the Active mode, it means that the corresponding user or software agent has input permission. In the passive mode, the corresponding user or agent does not have input permission. In the attention-getting Signalling mode, the corresponding user or agent desires input permission, i.e., would like whoever currently has input permission to relinquish it.

For example, in one embodiment of the invention in which each cursor is a different color pointing hand icon, when the cursor is Active, the hand is a solid color; when it is passive, the hand is only an outline; and when it is Signalling, the outline hand blinks or oscillates in order to get the other users' attention.

Thus at all times it is easy for all users to see who has or desires input permission simply by looking at the appearance of the cursors on the shared window. Software agents can find out who has or desires input permission by sending the appropriate control requests to the controller module.

Human users move their cursors and provide input simply by moving and clicking their mouse, i.e., the cursor replaces the usual mouse pointer on the shared window. Because cursors are replicated, they can also be used for pointing out items to remote users, making separate telepointers unnecessary.

A software agent does not have a display or mouse. As a result, software agents move their cursors and provide input by sending the appropriate control requests directly to the controller module.

All cursors start out in passive mode located off the shared window. When a user or software agent moves his cursor onto the shared window, it remains in the passive mode until the user or agent attempts to provide input, e.g., until the user presses a mouse button or key. At this point, the system automatically grants input permission to that user or software agent, i.e., makes the cursor Active, if and only if no one else is Active. If the user or agent's cursor is not made Active, then it is put into Signalling mode.

In one embodiment, a user or software agent relinquishes input permission simply by moving his cursor off the shared window. Moreover, a user can force the Active user or software agent to relinquish input permission by clicking on that user or agent's cursor. A software agent can force the Active user or agent to relinquish input permission by sending the appropriate control request to the controller module.

In one embodiment, each user and software agent is provided with a special window, called a Home Window, which is a place for the user or agent to put his cursor when he does not want to point or provide input. Like cursors, Home Windows are replicated on all displays. Home Windows assist in identification because each Home Window is labelled with the name and possibly the face of the corresponding user or software agent, and is coded with, for example, the same color as the corresponding cursor.

Another function of Home Windows is to support communication between users and software agents. Typically, in addition to sharing windows, human users are also in voice communication, e.g., by telephone. Software agents, however, typically cannot speak or hear, and therefore need some other mechanism for communicating with users. Human users and software agents can therefore display text messages in their Home Windows, which since they are replicated on all displays, will be seen by all users. Users can compose messages either by typing the text or by selecting from a menu of predefined messages. Agents can read users' displayed messages by sending the appropriate control requests to the controller module. As an additional convenience, users can force another user or agent to relinquish input permission by clicking on that user or agent's Home Window.

In summary, a system is provided to automatically control input permission when multiple users and/or software agents interact with a single, shared application in a window-based computing environment, and to indicate to all users which user or software agent currently is providing input or seeking input permission. The system operates by providing each user and agent with a specialized cursor icon that is used for displaying input-permission status and for requesting and relinquishing input-permission. Cursors have three modes with distinct appearances indicating whether the corresponding user or agent has, does not have, or desires input permission. Cursors are replicated on all displays, so that all users can at all times easily see who has or desires input permission. Users interact with the input-permission system by moving and clicking their mouse. Software agents achieve the same effects by sending control requests directly to a software interface provided as part of the invention. In one embodiment, each user and agent also has an assigned Home Window, which is used for identification and to compose and display text messages.

BRIEF DESCRIPTION OF DRAWINGS

These and other features of the Subject Invention will be better understood in conjunction with the Detailed Description taken in conjunction with the Drawings of which.

DETAILED DESCRIPTION

Figure 1:
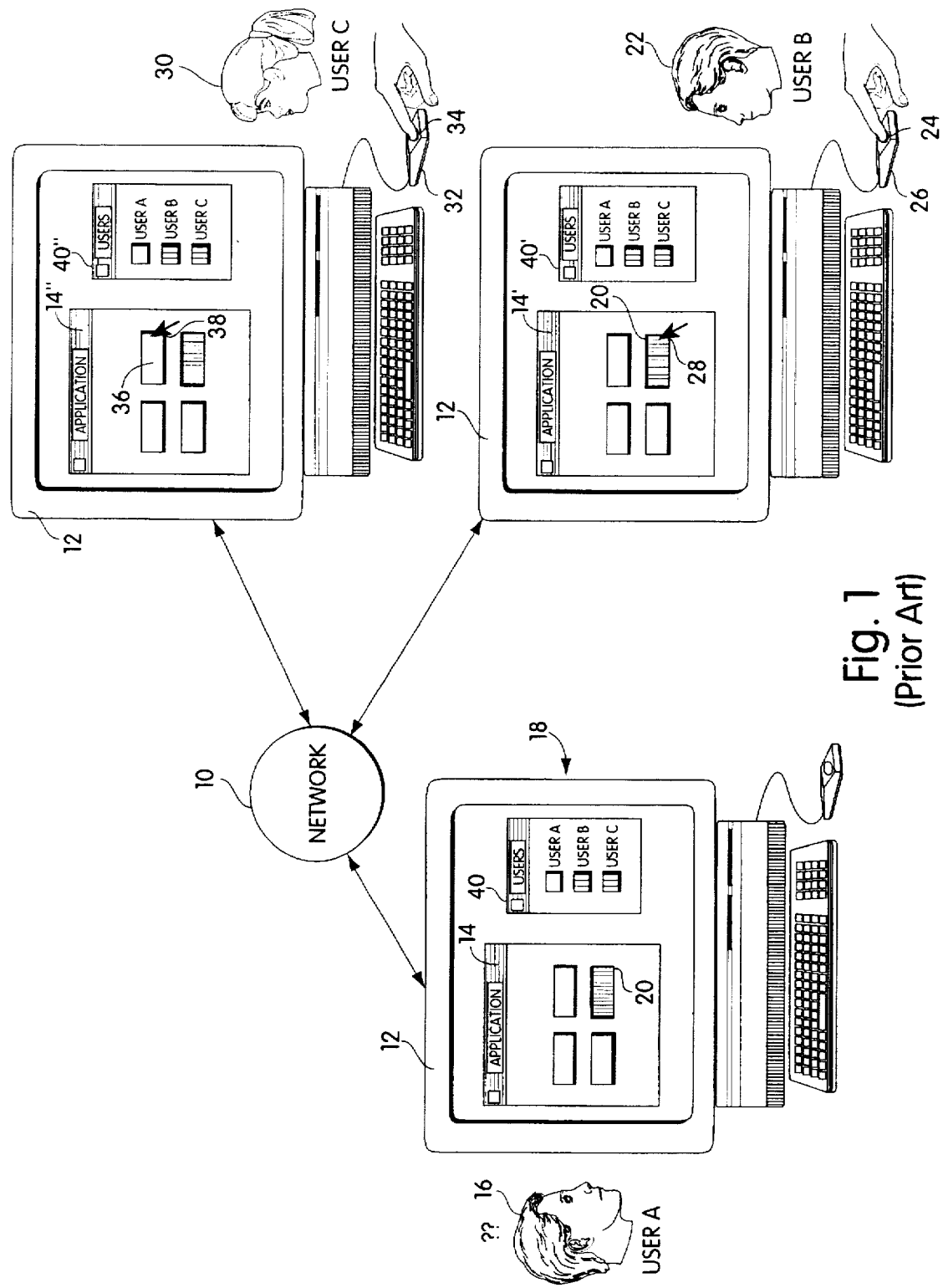
FIG. 1 is a diagrammatic illustration of a typical prior art system, showing a shared, replicated application window and an input-permission control window, where one user cannot tell from his display which of the other remote users is currently providing input to the shared window.

Referring now to FIG. 1, in the prior art a network 10 connects computer nodes 12 such that windows 14, 14', and 14" are duplicate window interfaces to a single shared application program. As is common, for example in the SharedX product, an additional replicated control window, 40, 40', and 40", is provided to indicate and modify which users have input permission. However, when more than one user has input permission, there is no indication of which user is actually providing input at any given moment. This makes it more difficult to collaborate, since users cannot ascertain who did what.

For example, a user 16 looking at window 14 at node 18 is in a quandry as to which of the other users on a network 10 has caused the depression of a button 20 as indicated. As illustrated, a second user 22 has in fact caused the depression of the button 20 by clicking a button 24 of his mouse 26. This user 22 can see which button of the shared window he is pressing by virtue of the location of a pointer 28 on window 14', whose position is controlled by mouse 26. However, this pointer 28 does not show up on window 14 which user 16 is looking at.

At nearly the same time, another user 30 is attempting through his associated mouse 32 and button 34 to actuate a different button 36 as indicated by pointer 38 on window 14". In such a situation, it quickly becomes hard for all users to figure out what is going on.

Figure 2:
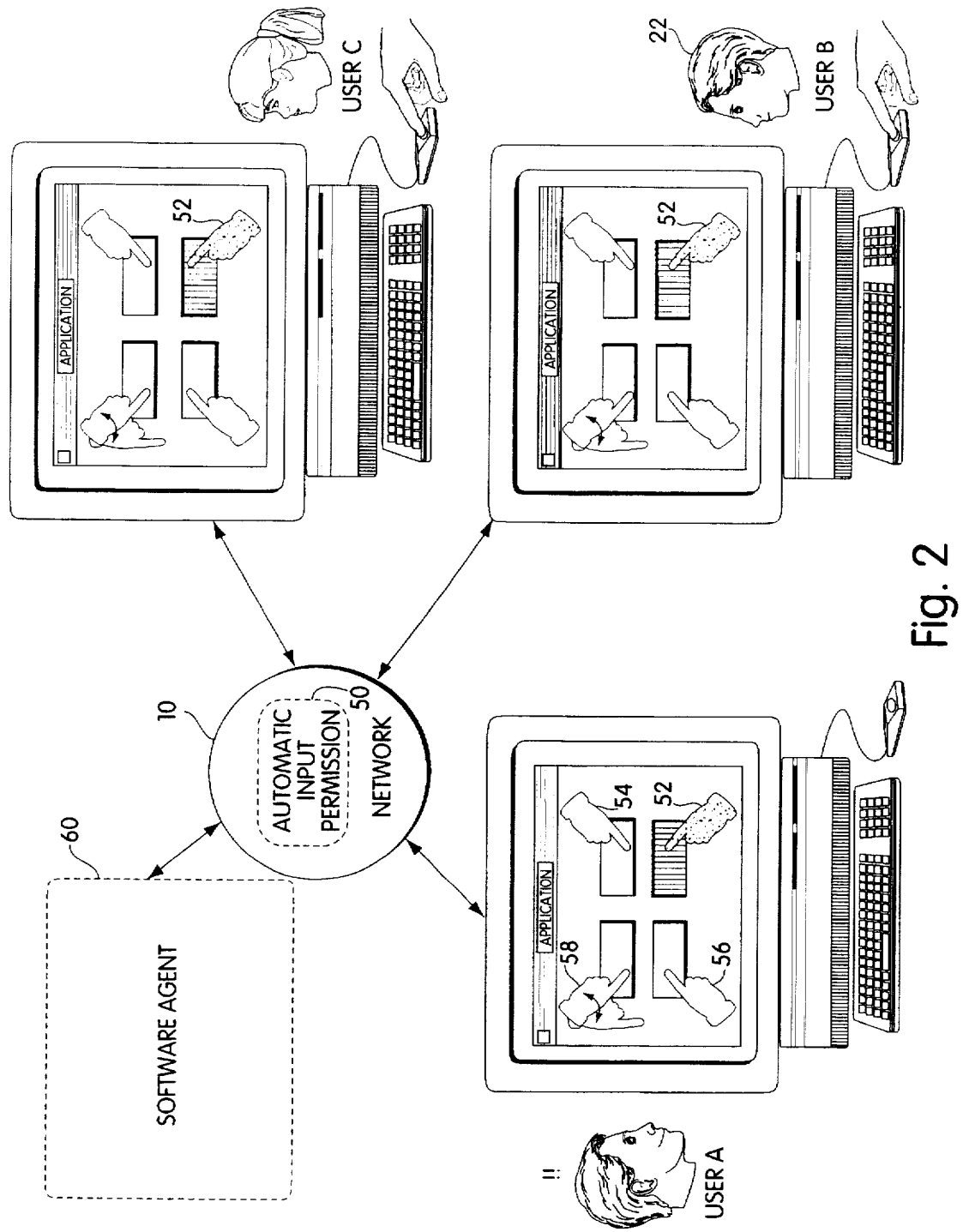
FIG. 2 is a diagrammatic illustration showing the use of the Subject Invention in the same situation as FIG. 1, with the addition of an automatic input-permission system and replicated cursors, so that a user can easily see which remote user has pressed a particular button, and the addition of a software agent participating in the collaboration on the same basis as the human users.

In an effort to make it easier for users to share windows without confusion, referring now to FIG. 2, network 10 is provided with an automatic input-permission system 50 which both selects which user has input permission and displays that information to all users through icons on the shared window. For instance, assuming that a user 22 has been granted input permission by automatic input-permission system 50, a unique cursor icon, in this case a solid upward and leftward pointing hand 52, is displayed on all windows at the location at which input will occur. Thus at any given time, it is clear to all users which user or software agent has input permission.

In the depicted embodiment, the correspondence between a cursor icon and a user or software agent is indicated by the orientation of the hand. In another embodiment, the color of the cursor icon is used to uniquely identify the corresponding user or software agent.

In the depicted embodiment, cursors 52, 54, and 56 belong to the human users shown in the lower right, upper right, and lower left of the figure, respectively. Cursor 58 belongs to a software agent 60 depicted in the upper left of the figure. Using a network 10 and the automatic input-permission system 50, a software agent 60 competes for the opportunity to provide input to the shared application in much the same way as the human users.

In the depicted embodiment, the cursor of the user or agent, if any, which currently has input permission is rendered as a solid hand, while all the other cursors are rendered in outline only. Notice that cursor 58 is oscillating, which is an attention-getting signal to the other users that the corresponding user or software agent desires input permission.

Figure 3B:
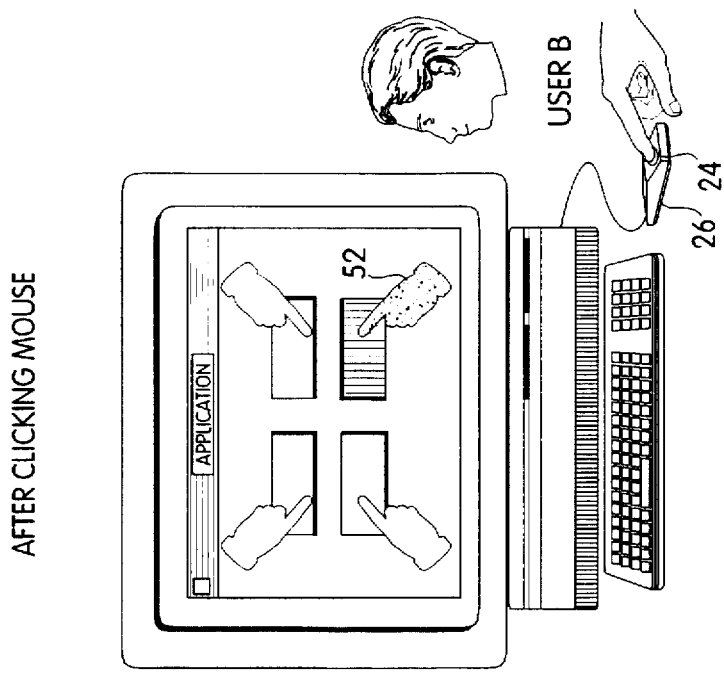
FIGS. 3A and 3B are diagrammatic illustrations showing how a user is automatically granted input permission simply by clicking his mouse, given that no other user or agent has input permission.
Figure 3A:
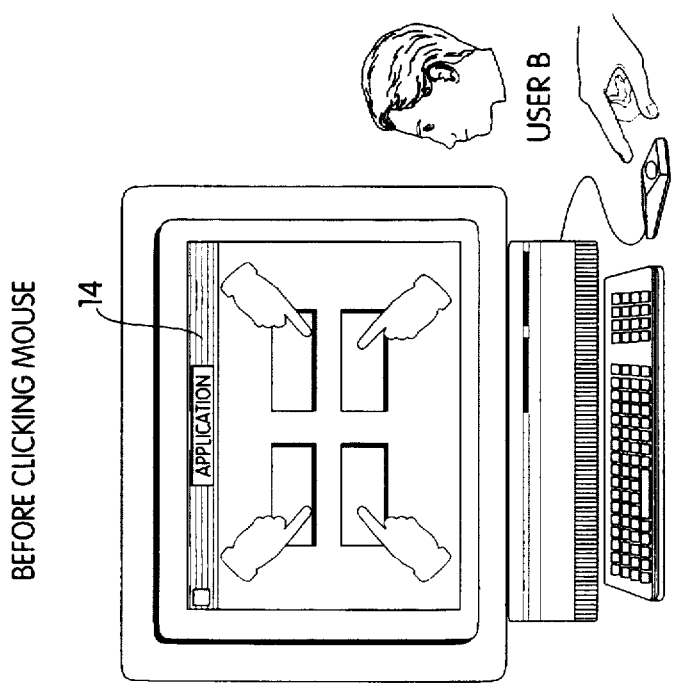

Referring now to FIG. 3A, when no user or software agent has input permission, all of the cursor icons on window 14 appear in outline. Referring now to FIG. 3B, a user 22 has clicked on a button 24 of a mouse 26, the result being that the corresponding cursor icon 52 has changed to being filled in, indicating that the user 22 has received input permission.

Figure 4:
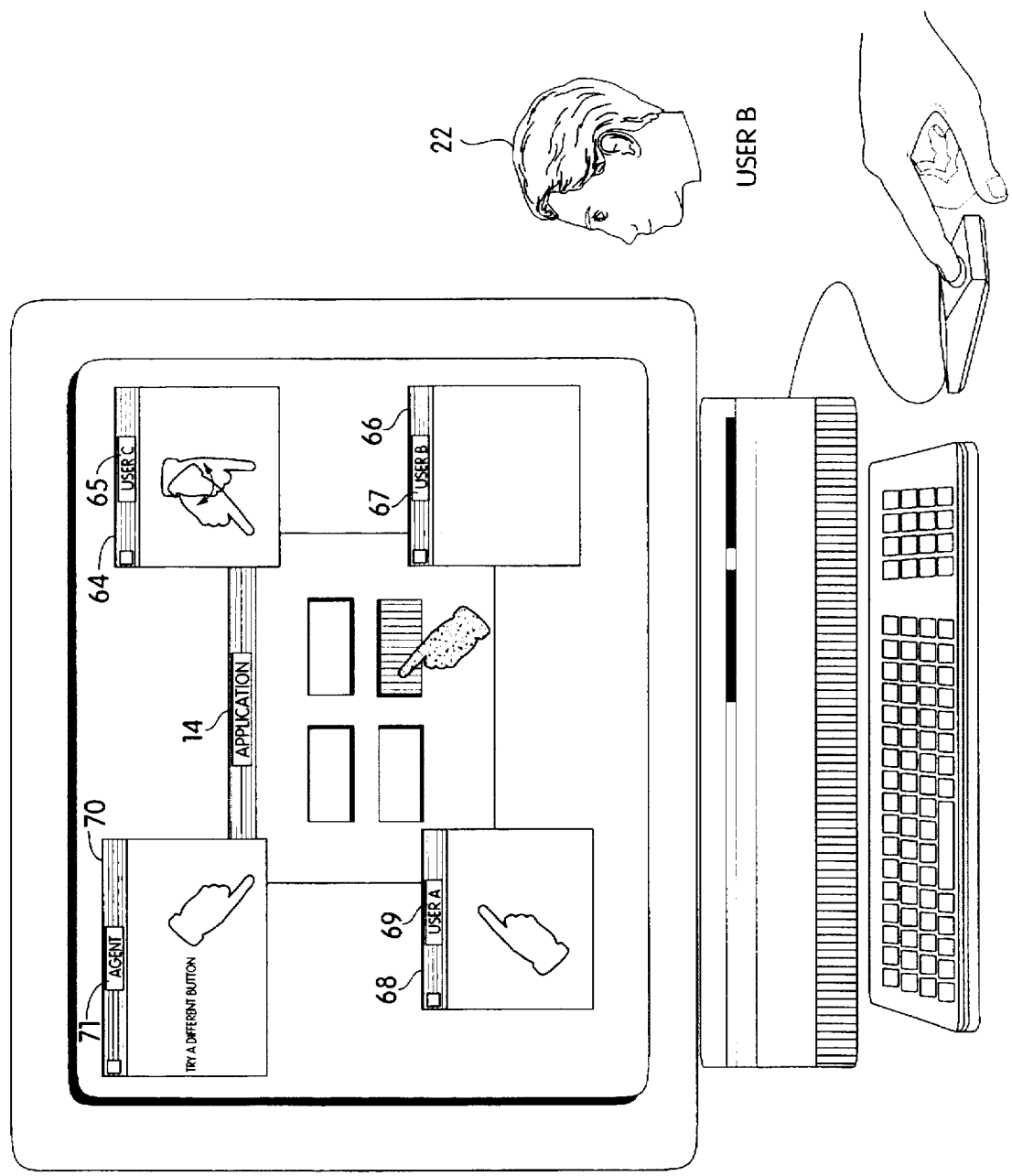
FIG. 4 is a diagrammatic illustration of the windows seen on all users' displays when Home Windows are used.

Referring now to FIG. 4, in one embodiment each user and software agent is assigned a Home Window 64, 66, 68, and 70, where the corresponding cursor icon appears when it is not on the shared window. Home Windows are replicated on all displays. Moreover, a title bar 65, 67, 69, and 71, on each Home Window can be used to display the name of the corresponding user or software agent.

Here it can be seen that a user 22 has moved his cursor icon from his Home Window 66 onto the shared window 14 and has been granted input permission. Also, the user with Home Window 64 is indicating his desire to obtain input permission by Signalling with an oscillating cursor. Home Windows also support the display of text messages to support collaboration between users and software agents. One such text message is illustrated at 72.

Figure 5:
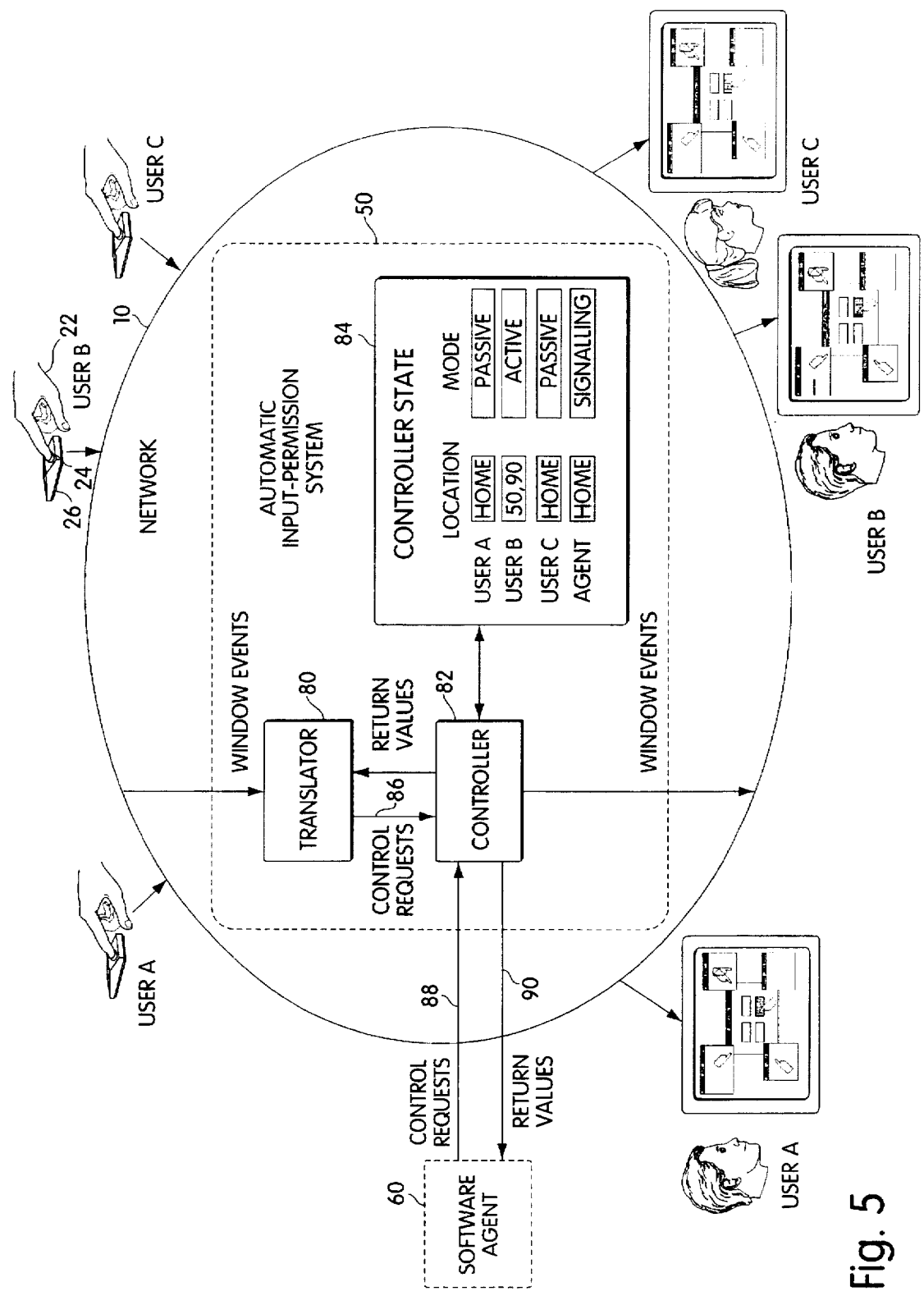
FIG. 5 is a block diagram of the automatic input-permission system of FIG. 2, showing its decomposition in one embodiment into a translator module and a controller module with associated controller state.

Referring now to FIG. 5, in one embodiment the automatic input-permission system 50 includes a translator module 80 connected to a controller module 82, which in turn reads and updates a controller state data structure 84. As can be seen, a network 10 transmits window events from all users' input devices to the translator module 80, which generates control requests over line 86 for execution by the controller module 82.

The controller module 82 receives control requests from either the translator module 80 or directly from software agents 60. The controller module 82 grants and retracts input permission, as well as producing window events transmitted through a network 10 to update the windows on all the users' displays.

By way of illustration, suppose a user 22 clicks a button 24 on his mouse 26 at a moment when his cursor is located on top of another user or agent's cursor. The resulting window event is transmitted through the network 10 to the translator module 80, where it is translated into an Interrupt request, i.e., a request to force the other user to relinquish input permission. The Interrupt request is then sent to the controller module 82, which checks whether the other user or agent in fact does currently have input control, and if it does, appropriately updates the controller state 84 and transmits through the network 10 the appropriate window events to change the other user's cursor appearance on all displays.

The rules by which the controller module grants and retracts input permission are carried by the data structure 84 interacting with the program stored in the controller module 82. As illustrated, for each user or software agent, there are two pieces of information stored within the data structure 84, namely location and mode. Location refers to the location of that user or software agent's cursor icon, which is either Empty, meaning that the cursor is not on the shared window, a particular x-y location on the shared window or, in an embodiment with Home Windows, on that user or software agent's Home Window. Mode refers to whether the user or software agent has input permission. In the Active mode, the user or software agent has input permission. In the passive mode, the user or software agent does not have input permission. In the Passive mode, the user or software agent does not have input permission. In the attention-getting Signalling mode, the user or agent does not have input permission and desires input permission.

It will be appreciated that a software agent 60 is connected through the network 10 to the automatic input-permission system 50 via line 88 on which control requests are transmitted directly to the controller module 82, in contradistinction to the human users who send window events to the translator module 90. Software agents can determine the result of their requests to the controller module 82 by examining the return values that are transmitted via line 90 from the controller module to the software agent.

Figure 6:
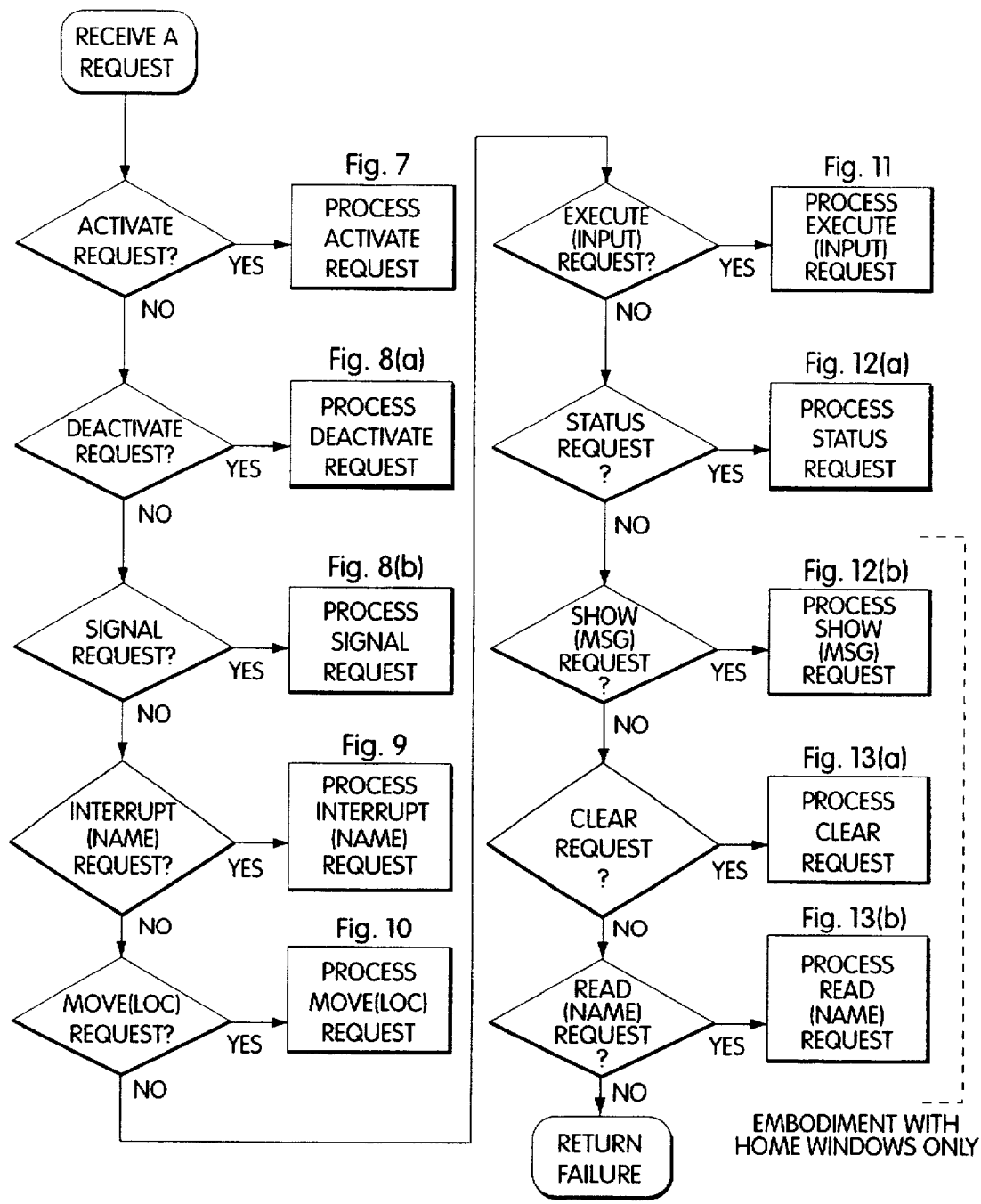
FIG. 6 is a flowchart showing the top-level logic of the controller module, which handles ten types of control requests.

FIG. 6 is a high-level flowchart for the processing in one embodiment of the controller module 82. Upon receipt of a request, the controller determines which of the ten valid requests types has been received and dispatches to the appropriate processing routine described further in the indicated figures. The ten decision blocks in this figure check in turn for the receipt of an Activate request, a Deactivate request, a Signal request, an Interrupt request for a given user or agent, a Move request to given location, an Execute request of a given input, a Status request, a Show request for given message, a Clear request, or a Read request for given user or agent.

Figure 7:
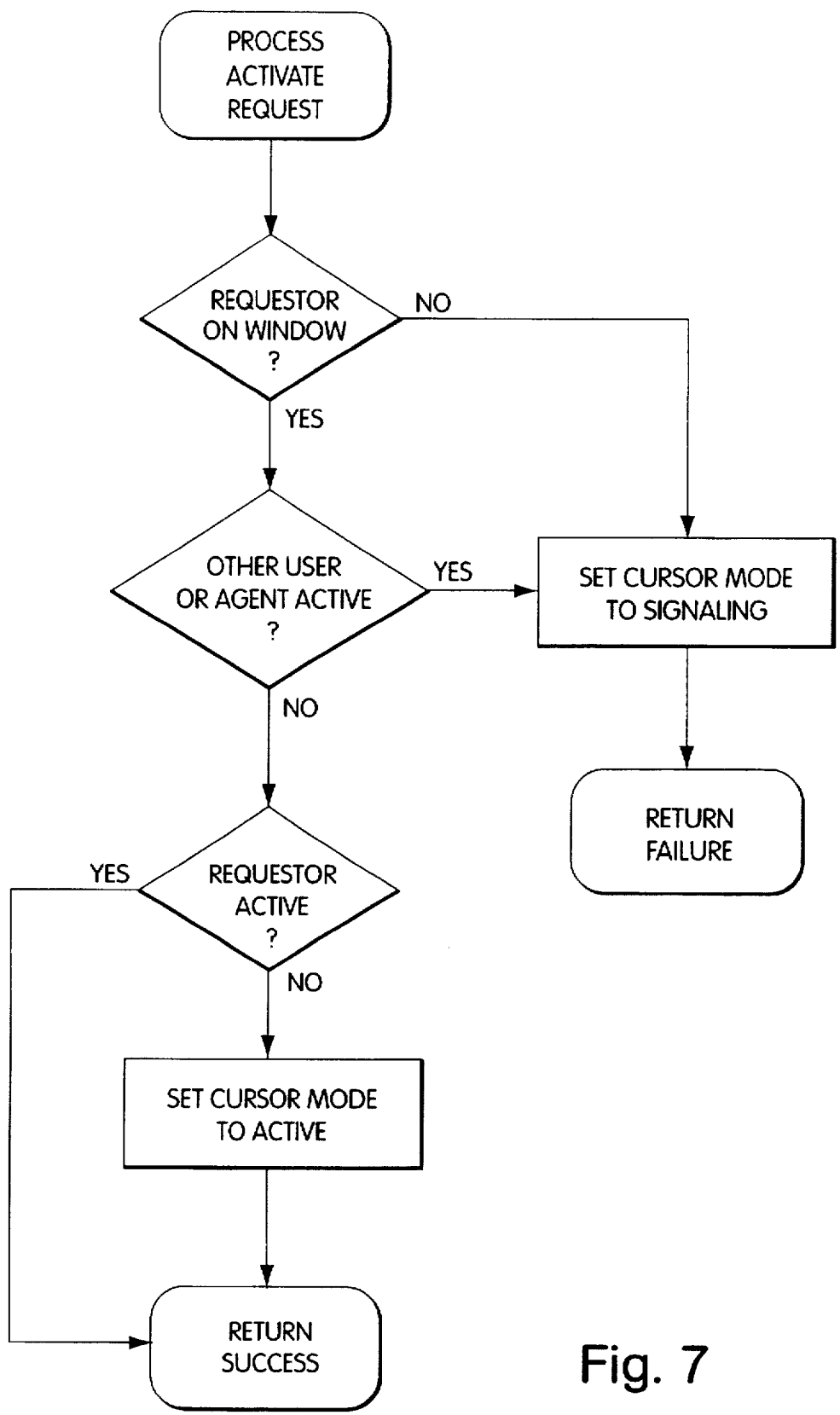
FIG. 7 is the detailed flowchart for the processing of an Activate request by the controller module.

FIG. 7 is a detailed flowchart for the processing of an Activate request. A software agent would send this type of request when it wants to provide input to the shared application window. This request type is automatically generated for users by the translator module whenever a user tries to provide input. If the user or software agent that issued the Activate request is located off the shared window or another user or agent is currently Active, then the requestor's cursor mode is set to Signalling and the request fails; otherwise, the requestor's cursor mode is set to Active and the request succeeds.

Figure 8A:
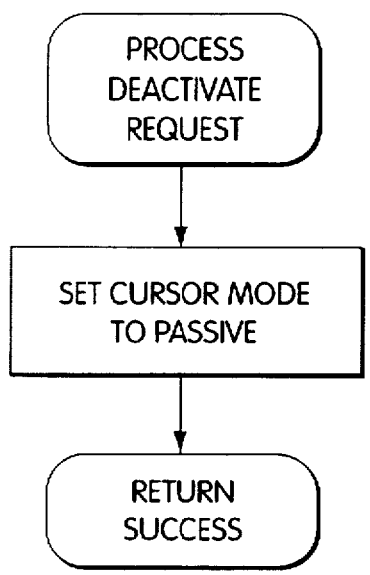
FIG. 8A is the detailed flowchart for the processing of an Deactivate request by the controller module.

FIGS. 8A is a detailed flowchart for the processing of Deactivate requests. A software agent would send this type of request when it was done providing input. This type of request is automatically generated for users by the translator module whenever a user leaves the shared window. The effect of a Deactivate request is simply to set the cursor mode of the requesting user or software agent to passive.

Figure 8B:
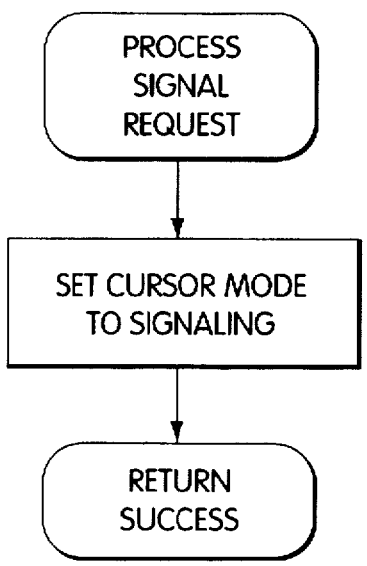
FIG. 8B is the detailed flowchart for the processing of a Signal request by the controller module.

FIGS. 8B is a detailed flowchart for the processing of Signal requests. A software agent would send this type of request when it wanted to get the attention of the other users and/or agents, for example, so it could begin providing input. In embodiments with Home Windows, this type of request is automatically generated for users by the translator module whenever a user clicks the mouse on his own Home Window. The effect of a Signal request is to set the cursor mode of the requesting user or software agent to Signalling, which causes the corresponding cursor icon to oscillate or blink on all displays. A user or software agent's cursor mode is also set to Signalling whenever an Activate request fails, as shown in FIG. 7.

Figure 9:
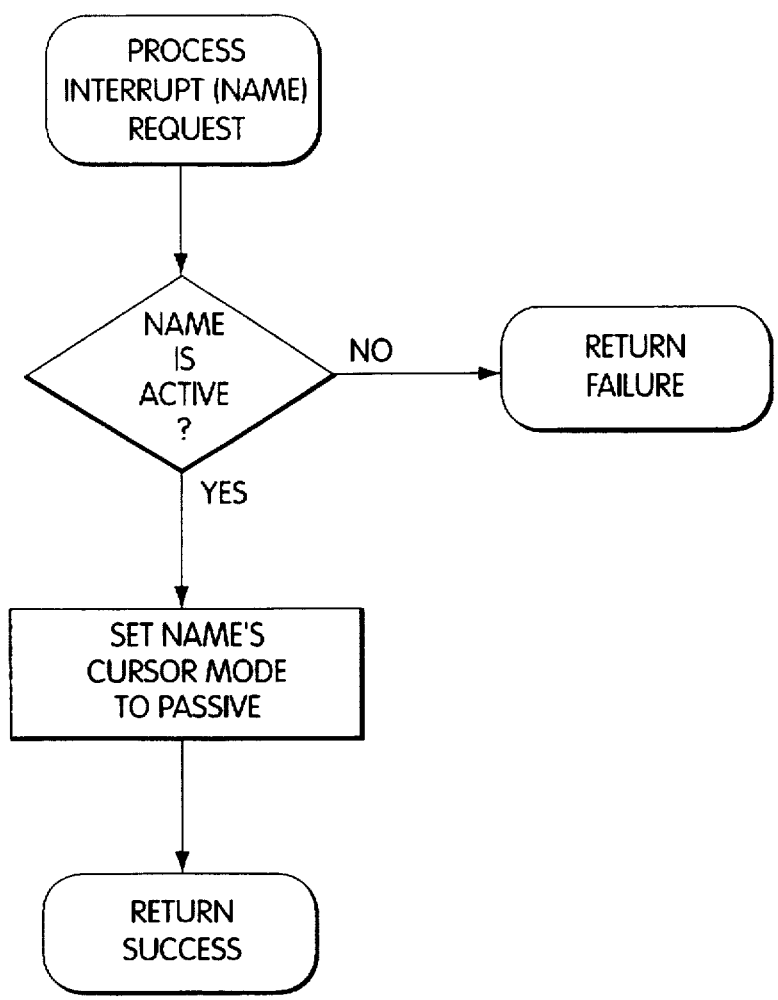
FIG. 9 is the detailed flowchart for processing of an Interrupt request by the controller module.

FIG. 9 is a detailed flowchart for the processing of an Interrupt request. This type of request would most typically be used by human users to take input permission away from software agents. In fact, in some embodiments, the automatic input-permission system may restrict who can interrupt whom. The translator module generates an Interrupt request, as shown in 16, whenever a human user clicks on top of another user or software agent's cursor. If that user or software agent's cursor is Active, the cursor's mode is set to passive and the request succeeds; otherwise the request fails. In embodiments with Home Windows, the translator module also generates an Interrupt request whenever a human user clicks on a Home Window other than his own.

Figure 10:
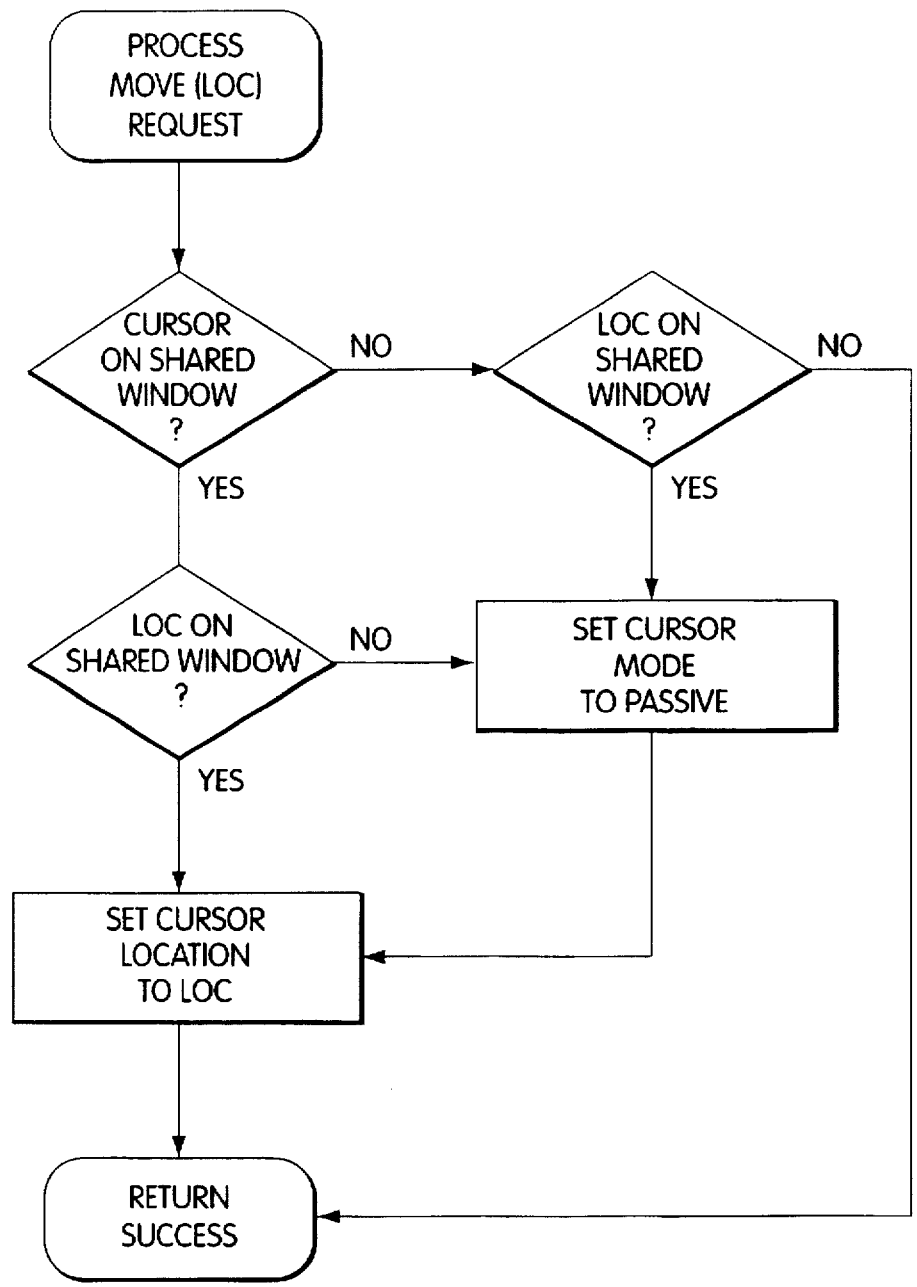
FIG. 10 is the detailed flowchart for processing of a Move request by the controller module.

FIG. 10 is a detailed flowchart for the processing of a Move request. Move requests are automatically generated for human users by the translator module in response to their mouse motions, so that their cursor icons appear to behave the same as their usual mouse pointers. Since software agents don't have mice, they move their cursors by sending Move requests directly to the controller module. If the requesting user or software agent's cursor is currently on the shared window and the new location is also on the shared window, then the requestor's cursor location is simply updated to the new location. If the requestor's cursor is moving from off the shared window to on or on the shared window to off, then the requestor's cursor mode is first set to passive. In either case, the Move request succeeds.

Figure 11:
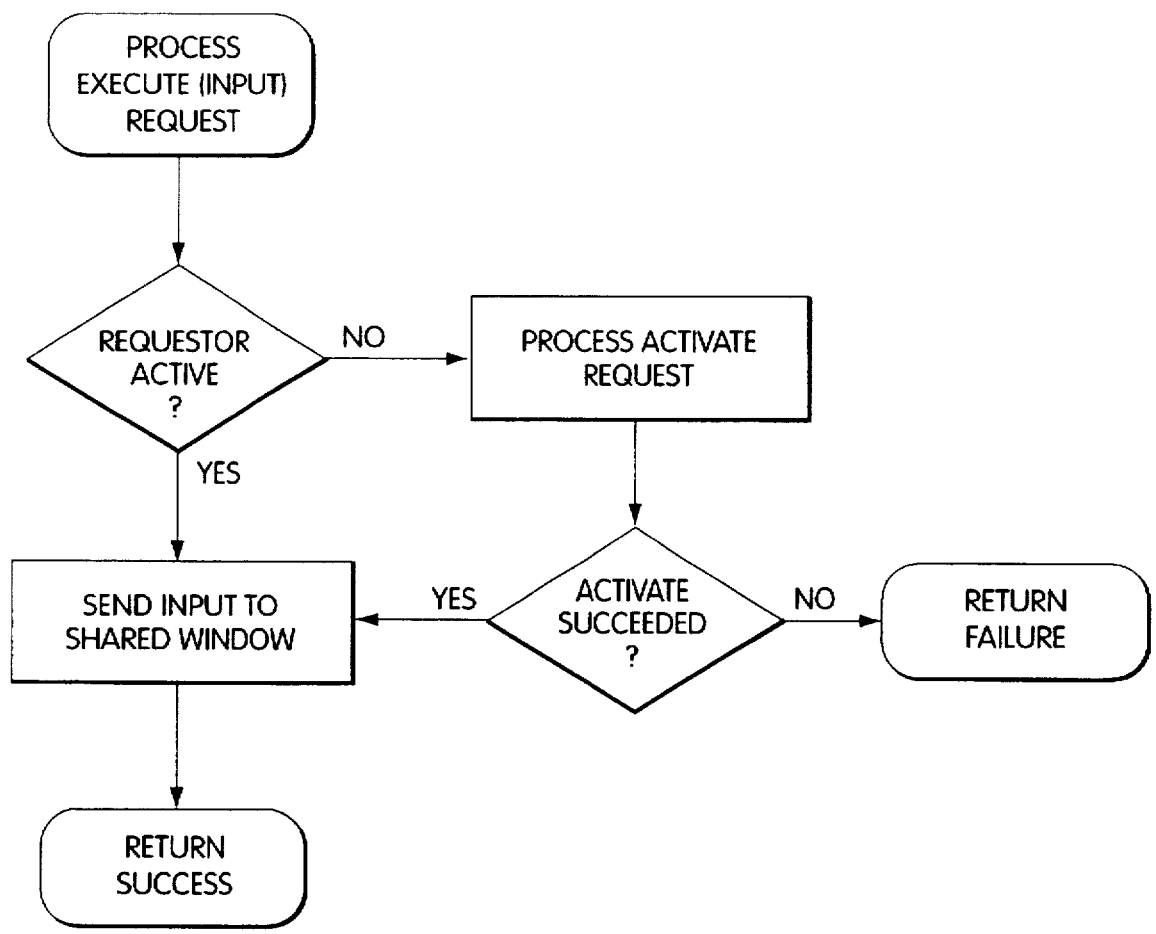
FIG. 11 is the detailed flowchart for processing of an Execute request by the controller module.
Figure 16:
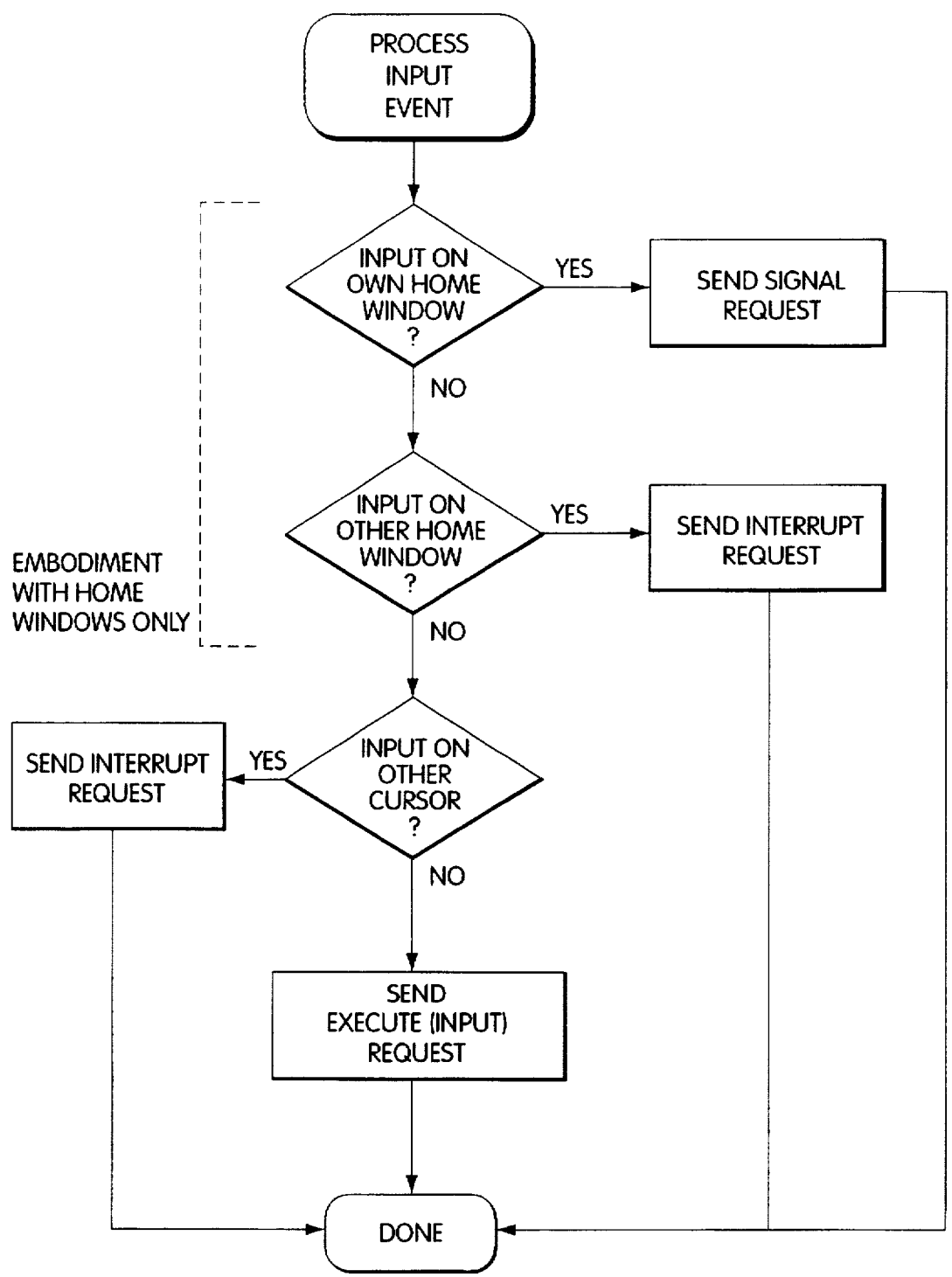
FIG. 16 is the detailed flowchart for processing of an Input event by the translator module.

FIG. 11 is a detailed flowchart for the processing of an Execute request. This request type is used by software agents to provide input, such as mouse and keyboard press and and release events, to the shared application window. From the standpoint of the shared application, input from a software agent looks just like input from any of the users. Execute requests are automatically generated for users by the translator module, as shown in FIG. 16. If the requesting user or software agent is Active, then the given input event is sent to the shared window and the request succeeds; otherwise the processing for an Activate request, shown in FIG. 7, is performed first. If the Activate processing fails, then the Execute request fails.

Figure 12A:
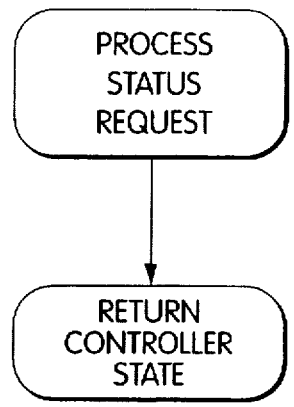
FIG. 12A is the detailed flowchart for processing of a Status request by the controller module.

FIG. 12A is a detailed flowchart for the processing of a Status request, which is used by software agents to find out about the location and mode of other users' and software agents' cursors because, unlike human users, software agents cannot simply look at their displays. A Status request returns the complete state of the controller in an appropriate data structure that can be interpreted by the requesting software agent.

Figure 12B:
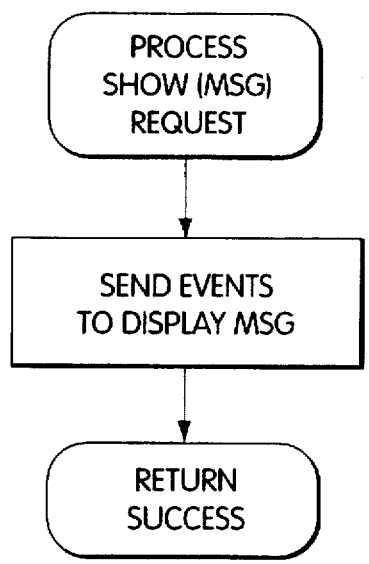
FIG. 12B is the detailed flowchart for processing of a Show request by the controller module.

FIG. 12B is a detailed flowchart for the processing of a Show request, which is used in embodiments with Home Windows only. This request is most likely to be used by software agents to communicate with human users. The Show request generates appropriate window events to display the given text message in the requesting user or software agent's Home Window. Since Home Windows are replicated, this information is displayed to all users. In one embodiment, human users can generate a Show request by interacting with a menu or text editor in their Home Window.

Figure 13A:
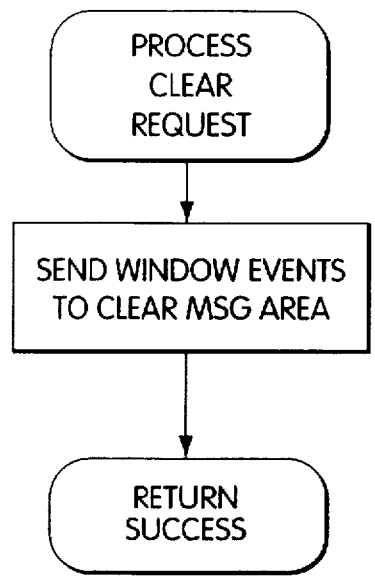
FIG. 13A is the detailed flowchart for processing of a Clear request by the controller module.
Figure 13B:
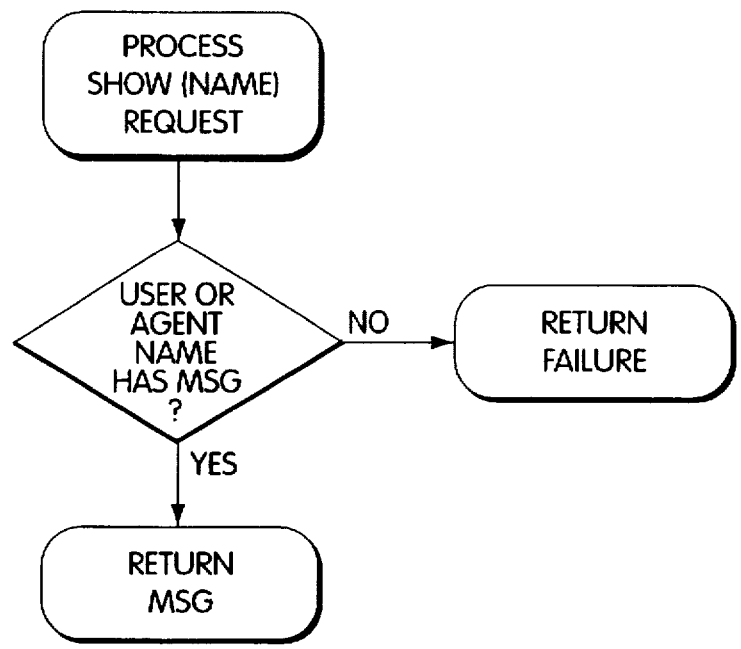
FIG. 13B is the detailed flowchart for processing of a Read request by the controller module.

FIG. 13A is a detailed flowchart for the processing of a Clear request, which is used in embodiments with Home Windows only. The Clear request generates appropriate window events to erase any messages currently appearing in the requesting user or software agent's Home Window.

FIG. 13A is a detailed flowchart for the processing of a Read request, which is used by software agents in embodiments with Home Windows to read messages from other users or software agents. If the given user or software agent currently has a text message displayed, then that message is returned to the requesting user or software agent; otherwise the request fails.

Figure 14:
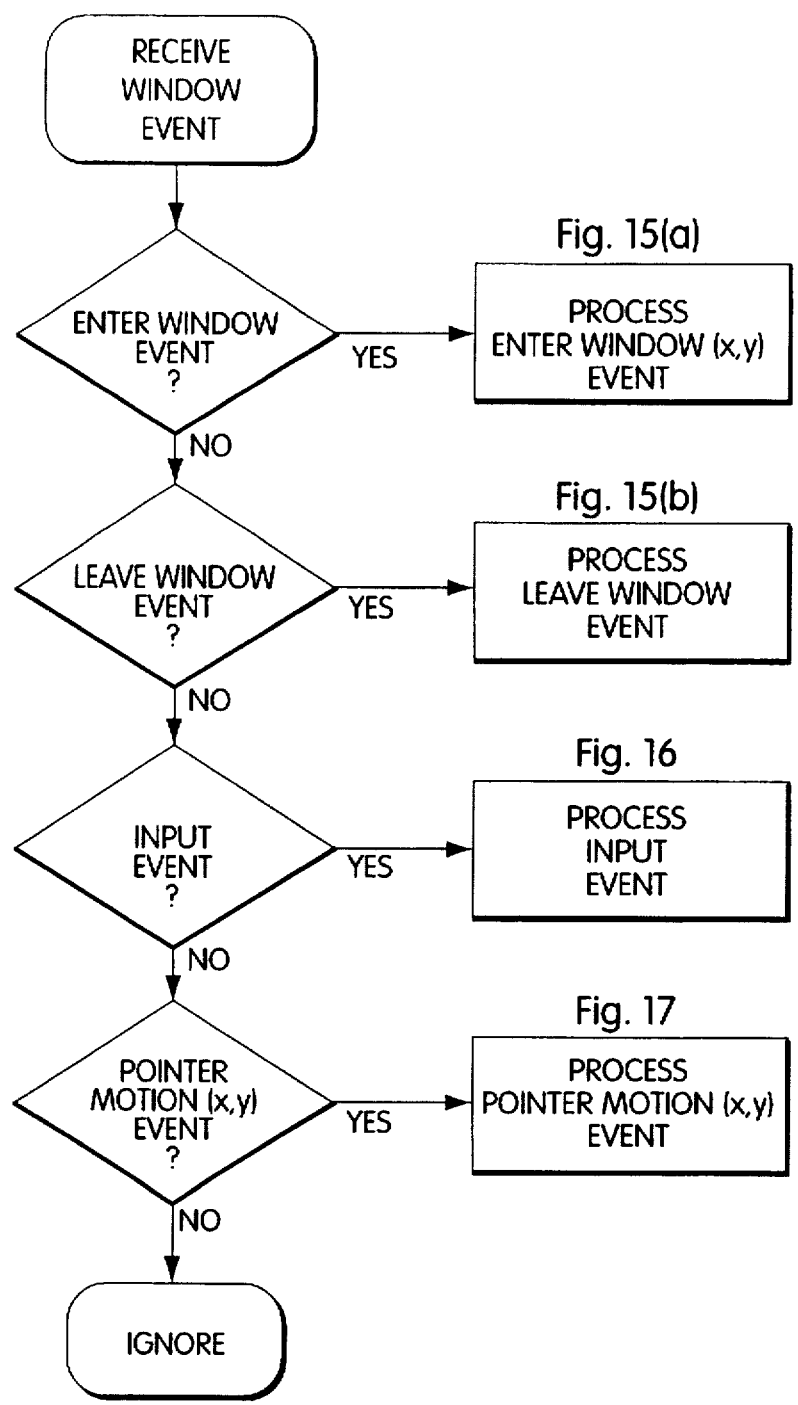
FIG. 14 is a flowchart showing the top-level logic of the translator module, which handles four types of window events resulting from a user's cursor actions.

FIG. 14 is a high-level flowchart for the processing in one embodiment of the translator module 80. Upon receipt of a window event from a user's display, the translator determines which of four relevant window event types has been received and dispatches to the appropriate processing routine described further in the indicated figures. These basic purpose of these processing routines is to send the appropriate requests to the controller module. The four decision blocks in this figure check in turn for the receipt of an EnterWindow event at a given x-y location, a LeaveWindow event, an Input event, or a pointerMotion event at a given x-y location. These are four generic event types in typical window systems. EnterWindow and LeaveWindow are the events generated when the pointer enters and leaves a window, respectively. pointerMotion is the event generated whenever the pointer moves. Input is the event generated when the user presses or releases a mouse button or key.

Figure 15A:
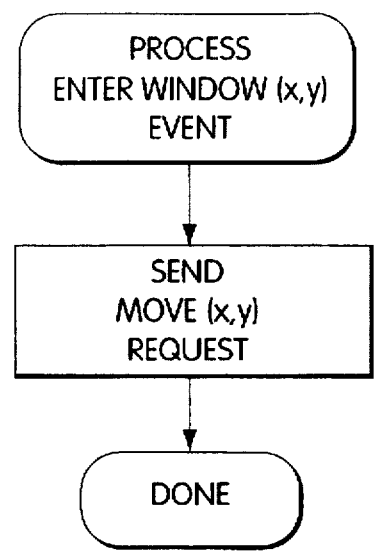
FIG. 15A is the detailed flowchart for processing of an EnterWindow event by the translator module.

FIG. 15A is a detailed flowchart for the processing of an EnterWindow event. While a user is moving his pointer around in windows other than the shared application window, his cursor location is either Empty, or in embodiments with Home Windows, at Home. Whenever the user's pointer enters the shared window, however, a Move request is generated, which updates his cursor's location in the controller state to the given x-y location, and causes his corresponding cursor icon to appear on the shared window. Notice that simply entering the shared window does not translate into a request for input permission. Input permission is not requested until the user actually clicks or presses a key on the shared window.

Figure 15B:
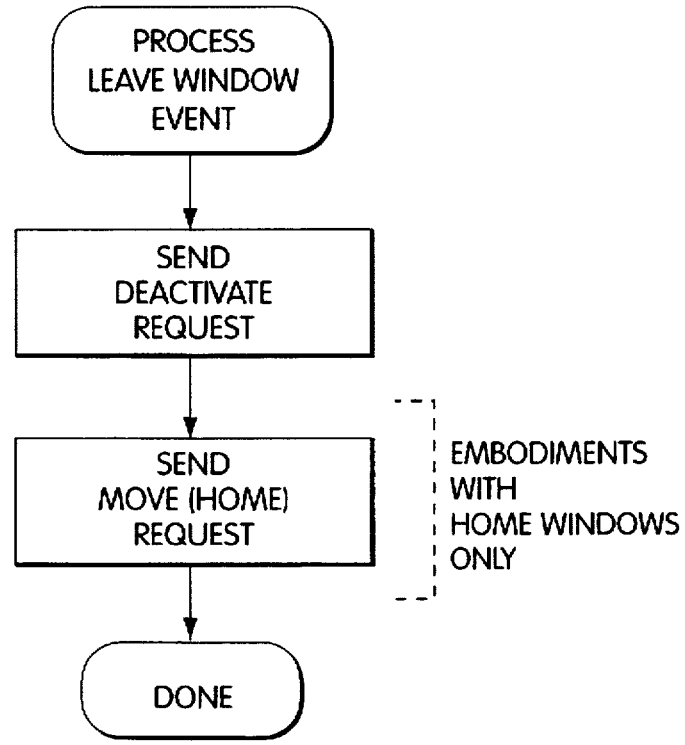
FIG. 15B is the detailed flowchart for processing of a LeaveWindow event by the translator module.

FIG. 15B is a detailed flowchart for the processing of a LeaveWindow event, in which a Deactivate request is generated. In embodiments with Home Windows, a Move request is also generated to move the user's cursor to his Home Window. Thus regardless of where else on his display his pointer is located, once a user leaves the shared window, from the standpoint of other remote users, his cursor appears on his Home Window.

FIG. 16 is a detailed flowchart for the processing of an Input event. Some Input events, such as clicking on another user's cursor to generate an Interrupt request, are used to interact with the automatic input-permission module. Other Input events, such as keyboard events, are in effect passed through to the application program. In embodiments with Home Windows, if the user's cursor is on his own or another user or software agent's Home Window, then either a Signal or an Interrupt request is generated, respectively; otherwise, if the user's cursor is on top of another cursor, then an Interrupt request is generated with the other cursor's owner as argument. Finally, if none of the above special cases hold, then an Execute request is generated with the given input as argument. Assuming that that the requesting user or software agent has or can be granted input permission, the Execute request will then pass this input on to the application program.

Figure 17:
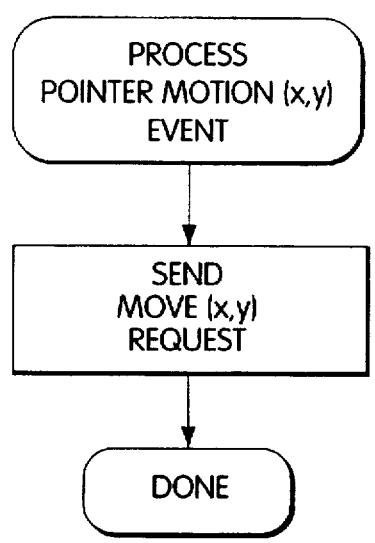
FIG. 17 is the detailed flowchart for processing of a pointerMotion event by the translator module.

FIG. 17 is a detailed flowchart for the processing of a pointerMotion event, in which a Move request is generated for the given x-y location. While a user's cursor is located on the shared window, his cursor icon tracks his mouse motions just like the usual mouse pointer.

Below is an embodiment of the Subject Invention written in Hp Common Lisp 4.0.3 from Harlequin, Inc. using the Garnet 2.1 graphics package from Carnegie Mellon University.

```
;;; ****************************************************************
;;;             Code for Window Application Sharing
;;; ****************************************************************

(defparameter *window-height* 300 "Height of application window")
(defparameter *window-width* 600 "Width of application window")

(defvar *x-window* nil "X window for application")
(defvar *x-root* nil "Root of *x-window*")
(defvar *panel* nil "Application panel on *x-window*")

(defvar *agents* nil "List of agents")
(defvar *self* nil "Bound to an agent inside each agent process")

(defvar *display-host*
  (opal::get-display-name (environment-variable "DISPLAY"))
  "Current display host name")

(defparameter *agent-priority* 100 "Priority of software agent processes")
(defparameter *local-priority* 50 "Priority of local interface processes")

(defstruct (agent
             (:print-function
               (lambda (agent stream depth)
                 (declare (ignore depth))
                 (format stream "#<Agent ~A>" (agent-name agent)))))
  (name "")                         ;unique string that names agent
  (display nil)                     ;display used by agent (if human)
  (window nil)                      ;application window (interactor-window)
  (window-id nil)                   ;X server id of window
  (others nil)                      ;X windows for other agents' remote homes
  (panel nil)                       ;application gadget in window
  (local nil)                       ;local home window (interactor-window)
  (local-id nil)                    ;X server id of local home window
  (remotes nil)                     ;remote home windows (interactor-window)
  (x 0)                             ;x location of hot spot of cursor
  (y 0)                             ;y location of hot spot of cursor
  (cursor nil)                      ;agent's on-window cursor (cursor)
  (home-cursor nil)                 ;agent's home cursor (home-cursor)
  (urgent nil)                      ;t iff agent is in urgent state
  (oscillate-process nil)           ;process controlling oscillating
  (process nil)                     ;agent process
  )

(defvar *host-display* opal::*default-x-display*)

(defvar *show* t "To inhibit show requests")

(defun init (&optional dick-host (text t))
  (kill)
  (setq *show* text)
  (if dick-host
      (create-agent "Dick" dick-host :top-left dick-face nil
```

- 17 -

```
                              user::*rightdown-fill* user::*rightdown*
                              user::*rightdown-oscillate*
                              opal:blue text)
        (create-agent "Smurk" nil :top-left smurk-face 'smurk-loop
                              user::*rightdown-fill* user::*rightdown*
                              user::*rightdown-oscillate*
                              opal:blue text))
    (create-agent "Chuck" (check* *display-host*) :bottom chuck-face nil
                    user::*rightup-fill* user::*rightup* user::*rightup-oscillate*
                    medium-green text)
    (create-agent "Glurk" nil :top-right glurk-face 'glurk-loop
                    user::*leftdown-fill* user::*leftdown* user::*leftdown-oscillate*
                    opal:red text)
    (setq *smurk-likes* (find-button "Button1"))
    (setq *smurk-hates* (find-button "Button7"))
    (setq *glurk-hates* (find-button "Button6"))
    (setq *glurk-likes* (find-button "Button9"))
    (init-agents)
    )

(defun init-agents ()
   (update)
   ;; start processes at end after all windows mapped
   (dolist (agent *agents*)
     (let ((loop (agent-process agent))
           (display (agent-display agent))
           (agent agent))               ;fix compiler bug
       (when (or loop display)
         (setf (agent-process agent)
               (make-process
                 :name (agent-name agent)
                 :priority (if display *local-priority* *agent-priority*)
                 :function
                 #'(lambda ()
                     (when display (flush-display display))
                     (handler-bind
                       ((error #'invoke-debugger))
                       (let ((*self* agent)
                             (inter:*enter-notify-hook* 'enter-notify)
                             (inter:*leave-notify-hook* 'leave-notify)
                             (inter:*motion-notify-hook* 'cursor-motion))
                         (loop
                           (if display
                               (inter::default-event-handler display)
                               (funcall loop)))))))))))
   t)

(defun kill ()
   (setq *panel* nil)   ;turn off agent processes
   (dolist (agent *agents*)
     (let ((oscillate (agent-oscillate-process agent))
           (process (agent-process agent)))
       (when (processp oscillate) (kill-process oscillate))
```

```
        (when (processp process) (kill-process process))
        (if-let (window (agent-window agent))
                (progn (opal:destroy window)
                       (opal:destroy (agent-local agent))))
        (mapc #'opal:destroy (agent-remotes agent))))
  (clean)
  (dolist (agent *agents*)
    (close-if-live (agent-display agent)))
  (setq *agents* nil chuck nil dick nil glurk nil
        *x-window* nil *x-root* nil
        *active* nil *passive* nil *lock* nil
        *smurk-likes* nil *smurk-hates* nil *glurk-likes* nil *glurk-hates* nil
        *user-send* nil *trace-agents* nil))

(defun create-agent (name display-name location face loop
                          active passive urgent
                          &optional (foreground-color dark-green) (text t))
  (let* ((master (create-instance nil cursor
                    (:active-image active)
                    (:passive-image passive)
                    (:foreground-color foreground-color)
                    (:hot-x (or (xlib:image-x-hot active) 0))
                    (:hot-y (or (xlib:image-y-hot active) 0))
                    (:visible nil)))
         (display (when display-name (open-opal-display display-name)))
         (agent (make-agent :name name :cursor master :display display)))
    (set (intern (string-upcase name)) agent)
    (when display
      (create-application agent display active passive foreground-color))
    (local-home agent location face passive urgent foreground-color text)
    (s-value (agent-home-cursor agent) :visible
             (o-formula (not (gv (agent-cursor agent) :visible)) t))
    ;; create slaved home windows and cursors
    (if-let (window (agent-window agent))
            (let ((agg (g-value window :aggregate)))
              (dolist (other *agents*)
                (progn (push (remote-home other window) (agent-others agent))
                       (opal:add-component agg (create-instance nil
                                                  (agent-cursor other)))))))
    (dolist (other *agents*)
      (if-let (window (agent-window other))
              (progn (push (remote-home agent window) (agent-others other))
                     (opal:add-component (g-value window :aggregate)
                                         (create-instance nil master)))))
    (push agent *agents*)                ;must be done here
    (setf (agent-process agent) loop)))

(defmacro with-opal-display (display &body body)
  `(let* ((opal::*default-x-display* ,display)
          (opal::*default-x-screen*
            (first (xlib:display-roots opal::*default-x-display*)))
          (opal::*default-x-root* (xlib:screen-root opal::*default-x-screen*))
          (opal::*default-x-colormap*
```

```
               (xlib:screen-default-colormap opal::*default-x-screen*)))
   ,body))

;;; Note assuming that there is at least one human user with display (defun create-application (agent display active passive foreground-color)
  ;; returns display
  (let* ((host (xlib:display-host display))
         (window (create-instance nil inter:interactor-window
                     (:top (if (some
                                 #'(lambda (agent)
                                     (if-let (d (agent-display agent))
                                             (equal (xlib:display-host d) host)))
                                 *agents*)
                               600 100))
                     (:left (half (- 1280 *window-width*)))
                     (:title "Application")
                     (:agent agent)
                     (:double-buffered-p t)
                     (:height *window-height*)
                     (:width *window-width*)))
         (top (create-instance nil top-aggregate))
         (panel (create-instance nil demo-panel
                     (:agent agent))))
    (s-value panel :value "Button2")
    (opal:add-component top panel)
    (s-value window :aggregate top)
    (setf (agent-window agent) window)
    (setf (agent-panel agent) panel)
    (with-opal-display display
      (opal:update window)
      (s-value window :background-color
               (display-color-get window opal:motif-gray))
      (opal:update window))
    (create-instance nil inter:button-interactor
                     (:window window)
                     (:agent agent)
                     (:start-where `(:in ,window))
                     (:continuous nil)
                     (:final-function 'click-final-function))
    (let ((drawable (drawable window))
          (root (display-root display))
          (screen (display-screen display))
          (color (display-color-get window foreground-color)))
      (setf (xlib:window-event-mask drawable) inter::*report-motion-em*)
      (setf (getf (xlib:window-plist drawable) 'active-x-cursor)
            (create-x-cursor active active root screen color))
      (setf (getf (xlib:window-plist drawable) 'passive-x-cursor)
            (create-x-cursor passive passive root screen color))
      (unless *panel*
        (setq *panel* panel
              *x-window* drawable
              *x-root* (display-root display))))
```

- 20 -

```
      (setf (agent-window-id agent) (xlib:window-id drawable)))
   display))

;;; ****************************************************************
;;;              Software Interface: Controller Requests
;;; ****************************************************************

(defvar *active* nil "Agent that is active, if any")
(defvar *passive* nil "List of agents that are on-window, but passive, if any")

;;; Note for simplicity in this application we are sequentializing
;;; requests by locking calling processes, rather than queuing.

(defvar *lock* nil "Lock for controller requests")

;;; Agent issuing request (*self*) is implicit argument to each request.

(defvar *trace-agents* nil "List of agents whose requests are to be traced")

(defun trace-agents (&rest agents)
  (dolist (agent agents)
    (pushnew agent *trace-agents*))
  *trace-agents*)

(defun untrace-agents ()
  (setq *trace-agents* nil))

(defmacro defrequest (name args &body body)
  (let ((trace (gensym))
        (value (gensym)))
    '(defun ,name ,args
       (let ((,trace (member *self* *trace-agents*)))
         (when ,trace (format t "~%~:(~A~): ~A~@{ ~A~}" (agent-name *self*) ',name
                             . ,args))
         (let ((,value (progn . ,body)))
           (when ,trace (format t " => ~A" ,value))
           ,value)))))

(defrequest ACTIVATE ()
  ;; Request control of shared window.
  ;; Succeeds iff agent is on window and no other agent is active.
  ;; After successful completion, agent is active.
  (unless (at-home? *self*)
    (with-process-lock (*lock*)
      (cond (*active* (eq *active* *self*))
            (t (setq *active* *self*)
               (s-value (agent-cursor *self*) :active t)
               (if-let (window (agent-window *self*))
                       (let ((drawable (drawable window)))
                         (set-cursor drawable
                                     (getf (xlib:window-plist drawable)
                                           'active-x-cursor))))
               (setq *passive* (delete *self* *passive*))
```

```
                (update-windows)
                t)))))

(defrequest DEACTIVATE ()
  ;; Relinquish control of shared window.
  ;; Always succeeds.
  ;; If agent is on window, then agent is passive at end of request,
  ;; otherwise request has no effect.
  (with-process-lock (*lock*)
    (when (eq *active* *self*)
      (deactivate-internal *self*)
      (pushnew *self* *passive*)
      (update-windows)))
  t)

(defun deactivate-internal (agent)
  (setq *active* nil)
  (s-value (agent-cursor agent) :active nil)
  t)

(defrequest MOVE (x y)
  ;; Move agent's cursor to given x,y location on shared window.
  ;; Always succeeds.
  ;; If agent is at home when request issued, then agent is passive at end
  ;;   of request.
  ;; [If agent is on window, cursor mode is unchanged.]
  (when (at-home? *self*)
    (with-process-lock (*lock*)
      (when *active*
        (s-value (agent-cursor *self*) :active nil)
        (pushnew *self* *passive*)))
    (oscillate *self* nil)                  ;see home
    ;; start cursor under (original location of) home
    (let ((location (g-value (agent-home-cursor *self*) :location)))
      (warp-cursor *self*
                   (ecase location
                     ((:top-left :bottom-left) 0)
                     ((:top-right :bottom-right) *window-width*)
                     (:bottom (half *window-width*)))
                   (ecase location
                     ((:top-left :top-right) 0)
                     ((:bottom-left :bottom-right :bottom) *window-height*))))
    (s-value (agent-cursor *self*) :visible t)
    (update-homes *self*))
  (move-cursor *self* x y)
  t)

(defrequest HOME ()
  ;; Relinquish control of shared window and return home.
  ;; Always succeeds.
  ;; If agent is on window when request issued, the agent is at home
  ;;   and passive at end of request.
  ;; [If agent is at home, then request has no effect.]
```

```
  (unless (at-home? *self*)
    (with-process-lock (*lock*)
      (when (eq *active* *self*) (deactivate-internal *self*)))
    (s-value (agent-cursor *self*) :visible nil)
    (oscillate *self* nil)
    (update-homes *self*)
    (update-windows))
  t)

(defrequest SIGNAL (flag)
  ;; Turn signalling on or off.
  ;; Succeeds iff agent is at home.
  ;; After successful completion, agent is in urgent state if flag
  ;; is non-nil, otherwise passive.
  (when (at-home? *self*)
    (oscillate *self* flag)
    t))

(defrequest INTERRUPT ()
  ;; Deactivate currently active agent, if any.
  ;; Succeeds iff there is an active agent [and returns that agent].
  ;; After successful completion, previously active agent is passive.
  (with-process-lock (*lock*)
    (let ((agent *active*))
      (when agent
        (deactivate-internal agent)
        (pushnew agent *passive*)
        agent))))

(defrequest EXECUTE (action)
  ;; Execute given pointer action at current shared window location.
  ;; Succeeds iff agent is active and action succeeds.
  (unless (at-home? *self*)
    (with-process-lock (*lock*)
      (when (eq *active* *self*)
        (funcall action *self*)))))

;;; This is the currently the only action that can be called
;;; from Execute above.

(defun CLICK (agent)
  ;; Send button-click event to shared window at agent's current cursor location.
  ;; Always succeeds.
  (let ((x (agent-x agent))
        (y (agent-y agent)))
    (agent-send-event :button-press :x x :y y
                      :time (+ inter::*last-time* inter:*double-click-time* 1))
    (agent-send-event :button-release :x x :y y))
  t)

;;; Queries [for information only, no state changes]

(defrequest QUERY-AGENTS ()
```

```
  ;; Returns list of agents
  *agents*)

(defrequest QUERY-ACTIVE ()
  ;; Returns active agent if any
  *active*)

(defrequest QUERY-DISPLAY (agent)
  ;; Returns non-nil if agent has a display (i.e., is human user)
  (agent-display agent))

(defrequest QUERY-LOCATION (agent)
  ;; Returns  (x . y) position on screen or nil if at home
  (unless (at-home? agent)
    (cons (agent-x agent) (agent-y agent))))

(defrequest QUERY-SIGNALLING (agent)
  ;; Returns non-nil iff agent is in urgent state
  (agent-urgent agent))

;;; ****************************************************************
;;;             TRANSLATOR
;;; ****************************************************************

;;; Whenever the pointer leaves the shared window (e.g. enters home),
;;; a HOME request is generated.

(defun leave-notify (window &rest ignore)
  (declare (ignore ignore))
  (when (= (xlib:window-id window) (agent-window-id *self*))
    (home))
  nil)

;;; Whenever the pointer enters the shared window (e.g., leaves home), a
;;; MOVE request is generated to move the user's cursor to that x/y
;;; location. [The text area of the user's home window is also
;;; cleared.]

(defun enter-notify (window x y &rest ignore)
  (declare (ignore ignore))
  (when (= (xlib:window-id window) (agent-window-id *self*))
    (set-cursor window (getf (xlib:window-plist window) 'passive-x-cursor))
    (let ((*pixels-per-warp* 10000))
      (move x y))
    (clear-internal *self*))
  nil)

;;; Whenever the pointer moves within the shared window, a MOVE
;;; request is generated with the new x/y location of the pointer.

(defun cursor-motion (window x y display)
  (declare (ignore display))
  (when (= (xlib:window-id window) (agent-window-id *self*))
```

- 24 -

```
    (let ((*pixels-per-warp* 10000))
      (move x y)))
  ;; to support dragging of show/hide-pointer
  (when (getf (xlib:window-plist window) :pointer)
    (inter::motion-notify window x y display)))

;;; Whenever the user clicks on the shared window, an ACTIVATE request
;;; is generated. If the activate request succeeds, then an
;;; (EXECUTE 'click) request is generated and the application program will
;;; see a button-click event at the location of the cursor. [If the
;;; activate request fails, then the local display beeps.]

(defparameter *meta-modifier* 8) ;see garnet-keytrans.lisp
(defparameter *meta-prefix* (aref inter::*prefixes* *meta-modifier*))
(defparameter *meta-prefix-length* (length *meta-prefix*))

(defun panel-stop-action (inter obj)
  (let ((char (inter:event-char inter:*current-event*)))
    (if (and (symbolp char)
             (string= *meta-prefix*
                      (symbol-name char)
                      :end2 *meta-prefix-length*))
        (call-prototype-method inter obj) ; click from execute request
        (click-final-function))))

(defun click-final-function (&optional inter obj)
  ;; final function for application interactor
  (declare (ignore inter obj))
  (if (activate)
      (execute 'click)
      (inter:beep)))

(defun panel-selection-function (gadget value)
  (declare (ignore gadget))
  (with-process-lock (*lock*)
    ;; synchronize panel on all displays
    (dolist (agent *agents*)
      (if-let (panel (agent-panel agent))
              (s-value panel :value value))))
  (update-windows))

;;; Whenever the user clicks on the cursor picture in his own local
;;; home window, an SIGNAL request is generated with a true argument
;;; if the user is passive, or a false argument if the user is urgent.

(defun signal-selection-function (gadget value)
  ;; selection function for home-cursor
  (declare (ignore value))
  (let ((agent (g-value gadget :parent :agent)))
    (when (eq agent *self*)
      (signal (not (agent-urgent agent))))))

;;; Whenever the user clicks on the remote home window of another
```

```
;;; agent, if that agent is active, then an INTERRUPT request
;;; is generated [otherwise the local display beeps].

(defun interrupt-final-function (inter obj)
  ;; final function for remote home interactor
  (declare (ignore inter))
  (let ((agent (g-value obj :agent)))
    (with-process-lock (*lock*)
      (cond ((eq agent *active*)
             (when *show* (show interrupt-text))
             (interrupt))
            (t (inter:beep))))))

;;; ******************************************************************
;;;                Support for Controller Requests
;;; ******************************************************************

(defun at-home? (agent)
  (g-value (agent-home-cursor agent) :visible))

(defun update-homes (agent)
  (update-if (agent-local agent))
  (mapc #'opal:update (agent-remotes agent)))

(defun update-windows ()
  (dolist (agent *agents*)
    (update-if (agent-window agent))))

(defparameter *pixels-per-warp* 10)

(defun move-cursor (agent x y)
  (let ((agent-x (agent-x agent))
        (agent-y (agent-y agent)))
    (unless (and (= x agent-x) (= y agent-y))
      (let* ((dx (- x agent-x))
             (dy (- y agent-y))
             (steps (/ (sqrt (+ (* dx dx) (* dy dy))) *pixels-per-warp*))
             (step-dx (funcall (if (minusp dx) #'floor #'ceiling) dx steps))
             (step-dy (funcall (if (minusp dy) #'floor #'ceiling) dy steps))
             (abs-step-dx (abs step-dx))
             (abs-step-dy (abs step-dy)))
        (dotimes (n (round (1- steps)))
          (warp-cursor agent
                       (setq agent-x
                             (if (< (abs (- x agent-x)) abs-step-dx)
                                 agent-x
                                 (+ agent-x step-dx)))
                       (setq agent-y
                             (if (< (abs (- y agent-y)) abs-step-dy)
                                 agent-y
                                 (+ agent-y step-dy))))
          (unless (agent-display agent) (sleep 0.1)))
        (warp-cursor agent x y)))))
```

```
(defun warp-cursor (agent x y)
  (let ((cursor (agent-cursor agent)))
    (s-value cursor :left (- x (g-value cursor :hot-x)))
    (s-value cursor :top (- y (g-value cursor :hot-y))))
  (setf (agent-x agent) x)
  (setf (agent-y agent) y)
  (update-windows))

(defparameter *button-motion-mask*
  (xlib:make-event-mask :button-press :button-release :pointer-motion))

(defun agent-send-event (event-key &rest event-slots
                                   ;; shared keys between button
                                   ;; and motion events
                                   &key (x 0) (y 0) (time 0)
                                   (root *x-root*) (root-x 0) (root-y 0)
                                   child (same-screen-p t) (code 1)
                                   &allow-other-keys)
  (apply #'xlib:send-event *x-window* event-key *button-motion-mask*
         :window *x-window* :x x :y y :state *meta-modifier*
         :time time :root root :root-x root-x :root-y root-y
         :same-screen-p same-screen-p :child child
         :code code event-slots)
  (display-output))

;;; ****************************************************************
;;;              Home Windows
;;; ****************************************************************

(defparameter *home-height* 120)
(defparameter *home-width* 160)

(defun remote-home (agent window)
  ;; Create remote home for agent on window
  ;; Return X-window
  (let* ((location (g-value (agent-home-cursor agent) :location))
         (home (create-instance nil inter:interactor-window
                                (:agent agent)
                                (:window window)
                                ;; this fixes obscure timing problem with rewidth
                                (:double-buffered-p t)
                                (:title (agent-name agent))
                                (:height *home-height*)
                                (:width *home-width*)
                                (:top (home-top window location))
                                (:left (home-left window location))))
         (face-hand (with-constants-disabled
                      (create-instance nil
                          (g-value (agent-home-cursor agent) :parent)
                        (:top (o-formula (gv-center-y-is-center-of
                                          (gvl :parent))))
                        (:parts '((:face :modify (:visible t)) :hand))))))
```

```
          (border (create-instance nil opal:rectangle
                    (:top 1)
                    (:left 1)
                    (:width (o-formula (1- (gvl :window :width))))
                    (:height (o-formula (1- (gvl :window :height))))
                    (:line-style (create-instance nil opal:line-style
                                   (:line-thickness 2)
                                   (:foreground-color
                                    (o-formula (g-value face-hand
                                                        :hand :filling-style
                                                        :foreground-color))))))))
          (top (create-instance nil top-aggregate)))
    (opal:add-component top face-hand)
    (opal:add-component top border)
    (s-value home :aggregate top)
    (push home (agent-remotes agent))
    (with-opal-display (xlib:window-display (drawable window))
      (opal:update home))
    (create-instance nil inter:button-interactor
                     (:window home)
                     (:agent agent)
                     (:start-where '(:in ,home))
                     (:continuous nil)
                     (:final-function 'interrupt-final-function))
    (drawable home)))

(defun local-home (agent location face passive urgent foreground-color text)
  (let* ((display (agent-display agent))
         (gadget (create-instance nil local-gadget
                   (:top (o-formula (gv-center-y-is-center-of (gvl :parent))))
                   (:parts
                    '((:home :modify
                       (:parts ((:face-hand
                                 :modify
                                 (:agent ,agent)
                                 (:face-prototype ,face)
                                 (:passive-image ,passive)
                                 (:urgent-image ,urgent)
                                 (:foreground-color ,foreground-color)
                                 (:face-on-right
                                  ,(not (member location
                                                '(:top-left :bottom-left)))))
                                (:panel-arrow :modify (:visible ,text)))))
                      :more :pencil))))
         (hand (g-value gadget :home :face-hand :hand)))
    (setf (agent-home-cursor agent) hand)
    (s-value hand :location location)
    (when display
      (let* ((window (agent-window agent))
             (home (create-instance nil inter:interactor-window
                     (:agent agent)
                     (:title (agent-name agent))
                     (:height *home-height*)
```

```
                                        (:width *home-width*)
                                        ;; fixes obscure timing problem with rewidth
                                        (:double-buffered-p t)
                                        (:top (home-top window location))
                                        (:left (home-left window location)))))
              (top (create-instance nil top-aggregate)))
        (opal:add-component top gadget)
        (s-value (g-value gadget :home :face-hand :face) :visible nil)
        (s-value home :aggregate top)
        (setf (agent-local agent) home)
        (with-opal-display display
          (opal:update home))
        (setf (agent-local-id agent) (xlib:window-id (drawable home)))
        (inter:warp-pointer home
                            (half (g-value home :width))
                            (half (g-value home :height))))))))

(defun home-top (window location)
  (ecase location
    ((:top-right :top-left)
     (- (g-value window :top) (half *home-height*)))
    ((:bottom :bottom-left :bottom-right)
     (- (opal:bottom window) (half *home-height*)))))

(defun home-left (window location)
  (ecase location
    ((:top-left :bottom-left) (- (g-value window :left) (half *home-width*)))
    ((:top-right :bottom-right) (- (opal:right window) (half *home-width*)))
    (:bottom (- (opal:center window) (half *home-width*)))))

;;; ******************************************************************
;;;             Cursors
;;; ******************************************************************

(create-instance 'STIPPLED-FILLING-STYLE opal:filling-style
  (:fill-style :stippled))

(defvar *filling-style*
  (o-formula (create-instance nil stippled-filling-style
               (:foreground-color (display-color-get (gvl :window)
                                                     (gvl :foreground-color))))))

(create-instance 'CURSOR-BITMAP opal:bitmap
  (:filling-style (o-formula (gvp :parent :filling-style))))

(create-instance 'CURSOR my-gadget-prototype
  (:top 0)
  (:left 0)
  (:width (o-formula (gvl :passive-cursor :width)))
  (:height (o-formula (gvl :passive-cursor :height)))
  (:active nil)                   ;modified by requests
  (:visible t)                    ;modified by requests
  (:hot-x 0)
```

```
   (:hot-y 0)
   (:passive-image user::*rightup*)
   (:active-image user::*rightup-fill*)
   (:foreground-color dark-green)
   (:filling-style (formula *filling-style*))
   (:parts
    '((:passive-cursor ,cursor-bitmap
        (:image ,(o-formula (gvp :parent :passive-image)))
        (:top ,(o-formula (gvp :parent :top)))
        (:left ,(o-formula (gvp :parent :left)))
        (:visible ,(o-formula (and (gvp :parent :visible)
                                   (not (gvp :parent :active))))))
      (:active-cursor ,cursor-bitmap
        (:image ,(o-formula (gvp :parent :active-image)))
        (:top ,(o-formula (gvp :parent :top)))
        (:left ,(o-formula (gvp :parent :left)))
        (:visible ,(o-formula (and (gvp :parent :visible)
                                   (gvp :parent :active)))))))))

;; Note this priority must be higher than *agent-priority* or oscillating
;; is starved out (defparameter *oscillate-priority* 50)

(defun oscillate (agent flag)
  (let ((oscillate (agent-urgent agent))
        (process (agent-oscillate-process agent)))
    (cond ((and flag (null oscillate))
           (setf (agent-urgent agent) t)
           (cond ((and process (processp process))
                  (activate-process process))
                 (t (setf (agent-oscillate-process agent)
                          (make-process
                            :name (string-append (agent-name agent) " Oscillate")
                            :priority *oscillate-priority*
                            :function
                            #'(lambda ()
                                (handler-bind
                                  ((error #'invoke-debugger))
                                  (loop
                                    (sleep 0.5)
                                    (s-value (agent-home-cursor agent) :urgent
                                             (not (g-value (agent-home-cursor agent)
                                                           :urgent)))
                                    (update-homes agent))))))))))
          ((and (null flag) oscillate)
           (setf (agent-urgent agent) nil)
           (when (and process (processp process))
             (deactivate-process process))
           (s-value (agent-home-cursor agent) :urgent nil)
           (update-homes agent)))))

;;; ****************************************************************
```

```
;;;            Text Communication
;;; ********************************************************************

(create-instance 'AGENT-TEXT multi-string-text
   (:font (opal:get-standard-font :sans-serif :bold :medium)))

(defun agent-text (&rest strings)
   (create-instance nil agent-text
      (:strings strings)))

(create-instance 'INTERRUPT-TEXT agent-text
   (:strings '("Interrupt.")))

(defrequest SHOW (gob)
   (when *show*
      (unless (is-a-p gob opal:graphical-object)
         (setq gob (apply #'agent-text (if (stringp gob) (list gob) gob))))
      (let* ((on-right (g-value (agent-home-cursor *self*) :face-on-right))
             (top (half (- *home-height* (g-value gob :height))))
             (left (if on-right (+ *home-width* 8) 8))
             (justification (if on-right :left :right))
             (remotes (agent-remotes *self*)))
         (unless (and remotes (is-a-p (g-value (first remotes) :show) gob))
            (clear-internal *self* on-right)
            (dolist (window remotes)
               (with-opal-display (window-display window)
                  (opal:add-component (g-value window :aggregate)
                                      (s-value window :show
                                               (create-instance nil gob
                                                  (:top top)
                                                  (:left left)
                                                  (:justification justification)))))
               (rewidth window (+ (g-value gob :width) *home-width* 16)
                        on-right))))))

(defrequest CLEAR ()
   (clear-internal *self*))

(defun clear-internal (agent &optional
                       (on-right (g-value (agent-home-cursor agent) :face-on-right)))
   (dolist (window (agent-remotes agent))
      (let ((gob (g-value window :show)))
         (when gob
            (opal:remove-component (g-value window :aggregate) gob)
            (opal:destroy gob)
            (s-value window :show nil)
            (rewidth window *home-width* on-right)))))

(defvar *user-send* nil "Variable to hold item sent by user")

(defun user-send (gadget item)
   (declare (ignore gadget))
   (setq *user-send* item)
```

```
  (show (string-append item ".")))

;;; ********************************************************************
;;;              Demonstration
;;; ********************************************************************

(create-instance 'DEMO-PANEL gg:motif-text-button-panel
        (:top (o-formula (- (gv-center-y-is-center-of (gvl :parent)) 50)))
        (:left (o-formula (gv-center-x-is-center-of (gvl :parent))))
        (:font (o-formula (gv my-gadget-prototype :bold)))
        ;; get version of motif-gray on this local display
        (:foreground-color (o-formula
                              (display-color-get (gvl :window) opal:motif-gray)))
        (:items '("Button1" "Button2" "Button3" "Button4" "Button5"
                  "Button6" "Button7" "Button8" "Button9" ))
        (:final-feedback-p t)
        (:toggle-p t)
        (:text-offset 10)
        (:v-spacing 10)
        (:h-spacing 10)
        (:direction :horizontal)
        (:rank-margin 3)
        (:selection-function 'panel-selection-function)
        (:interactors
         '((:press :modify
            (:continuous nil)
            (:waiting-priority ,inter:high-priority-level)
            (:start-event :any-leftdown)
            (:stop-action 'panel-stop-action)))))

(defvar *glurk-likes* nil "Button that Glurk likes")
(defvar *glurk-hates* nil "Button that Glurk hates")

;;; Glurk thinks setting Button6 is a bad idea; whenever he sees
;;; Button6 set, he tries to clear it. Glurk likes Button9; whenever
;;; another button is set, he suggest setting Button9 by putting a
;;; passive finger on it. Glurk also likes to play with the
;;; buttons. Whenever there are no buttons set, he starts to press
;;; each button in turn, but will stop if he sees signalling from
;;; either of the two humans.

(create-instance 'ALL-BUTTONS-TEXT agent-text
  (:strings '("I'd like to try all the buttons."
              "OK?")))

(create-instance 'HATE-TEXT agent-text
  (:strings '("I hate Button7."
              "I'm going to turn it off!")))

(create-instance 'LIKE-TEXT agent-text
  (:strings '("Button9 would be better.")))

(defun glurk-loop ()
```

```
(when *panel*
   (cond ((equal *user-send* "Try all the buttons")
          (try-all-buttons))
         ((and (query-signalling *self*) (if *show*
                                             (equal *user-send* "Ok")
                                             (query-active)))
          (signalling nil)
          (show all-buttons-text)
          (when (if *show* (ok-or-no) t)
            (try-all-buttons)
            (home)))
         ((g-value *panel* :value)
          (signalling nil)
          (cond ((g-value *glurk-hates* :selected)
                 (show hate-text)
                 (when (activate) (clear-button *glurk-hates*)
                   (clear)
                   (home)))
                ((g-value *glurk-likes* :selected)
                 (clear)
                 (home))
                (t (show like-text)
                   (move-button *glurk-likes*))))
         (t (clear)
            (home)
            (signalling t))))
   (sleep 1))

(defvar *smurk-likes* nil "Button that Smurk likes")
(defvar *smurk-hates* nil "Button that Smurk hates")

;;; Smurk hates like Button7; whenever he sees it set, he tries to clear it.

(defun smurk-loop ()
  (when (and *panel* (g-value *smurk-hates* :selected) (not (query-active)))
    (move-button *smurk-hates*)
    (activate)
    (execute 'click)
    (home))
  (sleep 1))

(defun ok-or-no ()
  (setq *user-send* nil)
  (prog1
      (loop
        (cond ((equal *user-send* "Ok") (return t))
              ((equal *user-send* "No") (return nil))
              (*user-send* (setq *user-send* nil)))
        (sleep 1))
    (clear)
    (setq *user-send* nil)))

(defun try-all-buttons ()
```

```
  (setq *user-send* nil)
  (clear)
  (let ((l (g-value *panel* :button-list :components)))
    (move-button (first l))
    (activate)
    (catch 'abort
      (dolist (button l)
        (abort?)
        (move-button button)
        (abort?)
        (execute 'click)
        (process-allow-schedule)
        (sleep 0.5)
        (unless (eq button *glurk-likes*)
          (abort?)
          (move-button button)
          (abort?)
          (execute 'click))
        (process-allow-schedule)
        (sleep 0.5)))
    (home)))

(defun abort? ()
  (when (or (not (eq (query-active) *self*))
            (if-let (agent (find #'query-signalling (query-agents)))
                    (not (eq agent *self*))))
    (throw 'abort t)))

(defun set-button (button)
  ;; returns non-nil iff succeeds
  (unless (g-value button :selected)
    (move-button button)
    (execute 'click)))

(defun clear-button (button)
  ;; returns non-nil iff succeeds
  (when (g-value button :selected)
    (move-button button)
    (execute 'click)))

(defun move-button (button)
  ;; always succeeds
  (let ((box (g-value button :button)))
    (move (center-x box) (center-y box))))

(defun find-button (string)
  ;; Returns instance of gg:motif-text-button
  (find string
        (g-value *panel* :button-list :components)
        :key #'(lambda (button) (g-value button :item-obj))
        :test #'equal))
```

In summary, the above describes a system in which multiple human users and/or software agents interact with a single, shared application window, such that each user or software agent can easily tell who is providing input at any given moment, and such that input permission is conveniently and automatically granted and relinquished. In the embodiments described above, the operation of the automatic input-permission system is divided between a controller module, which contains the essential rules for granting and relinquishing input permission, and a translator module, which maps users' graphical motions into controller requests. This decomposition makes it possible for software agents to participate in window sharing on the same basis as human users. Furthermore, in embodiments with Home Windows, the correspondence between users or software agents and their cursor icons is made more evident, as well as facilities provided for text communication between users and/or software agents.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system for the control of a single program running at one location, said program shared by users of a network of associated terminals, each terminal having a display screen, a dedicated window at said display screen and window input event generating means, the results of running said shared program being displayed at each terminal through the use of the window thereat, comprising:

means coupled to said network at said one location for both storing and executing said single program and for storing data associated therewith such that said single program and associated data storage are co-located and such that said storing and executing means provides a single running program shared by said users;

means including a software agent and coupled to said network for automatically permitting a window input event from one user to control said shared program such that said program is under the control of said one user; and, means for indicating to all of said users which of said users has been granted permission to control said shared program.

2. The system of claim 1, wherein said indicating means include means for indicating to all users when any of said users is seeking input permission.

3. The system of claim 2, wherein said automatic input-permission establishing means includes means for ascertaining when any of said users is seeking input permission.

4. The system of claim 1, wherein said indicating means includes means for generating an on-screen cursor icon unique to each user at each of said display screens such that each of said icons is replicated on all of said display screens.

5. The system of claim 4, wherein said indicating means includes means for altering the appearance of said on-screen cursor icon, depending on whether said user has input permission.

6. The system of claim 4, wherein said indicating means includes means for altering the appearance of said on-screen cursor icon, depending on whether said user desires input permission.

7. The system of claim 1, wherein said indicating means includes indicia at each screen for indicating on-screen which of said users has been granted input permission.

8. The system of claim 1, wherein said display screen includes on-screen control icons, and wherein said means for automatically establishing input permission includes means available to each of said users and including a mouse for moving a cursor associated with a user over said display screen and for actuating an on-screen control icon by overlaying said control icon with said cursor and clicking said mouse.

9. The system of claim 4, and further including means for generating home windows on each of said display screens, each associated with a different user, at which the on-screen cursor icon associated with said user initially resides.

10. The system of claim 9, wherein said means for automatically establishing input permission includes means for moving an icon from said home window to said window.

11. The system of claim 1, and further including a software agent and means for coupling said software agent to said means for automatically establishing input permission.

12. The system of claim 1, wherein said indicating means includes means for generating an on-screen cursor icon unique to said software agent.

* * * * *